(12) United States Patent
Shveidel et al.

(10) Patent No.: US 12,430,065 B1
(45) Date of Patent: Sep. 30, 2025

(54) TECHNIQUES FOR PROVIDING DATA CONSISTENCY

(71) Applicant: Dell Products L.P., Hopkinton, MA (US)

(72) Inventors: Vladimir Shveidel, Pardes-Hana (IL); Uri Shabi, Tel Mond (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/758,297

(22) Filed: Jun. 28, 2024

(51) Int. Cl.
*G06F 3/06* (2006.01)

(52) U.S. Cl.
CPC ............ *G06F 3/0655* (2013.01); *G06F 3/061* (2013.01); *G06F 3/0679* (2013.01)

(58) Field of Classification Search
CPC ....... G06F 3/061; G06F 3/0655; G06F 3/0679
See application file for complete search history.

(56) References Cited

U.S. PATENT DOCUMENTS

2013/0318288 A1* 11/2013 Khan ................... G06F 3/0679 711/103
2022/0229734 A1* 7/2022 Seela .................. G06F 11/1451

OTHER PUBLICATIONS

U.S. Appl. No. 18/160,404, filed Jan. 27, 2023, entitled System and Method for Managing Data Portion Ownership in a Storage Cluster, Vladimir Shveidel, et al.

* cited by examiner

*Primary Examiner* — Jane W Benner
(74) *Attorney, Agent, or Firm* — BainwoodHuang

(57) ABSTRACT

In at least one embodiment, processing can include receiving at a first node a read I/O operation that requests to read content stored at a logical address LA owned by a second node. Responsive to the second node receiving a request regarding LA from the first node, the second node can perform address resolution processing using mapping information for LA that includes: an address PA1 of a page P1 of storage of a first PLB (physical large block) where C1 is stored, a value V1 of a generation identifier GenID1 of P1 and the first PLB, and a hash value HV1 for C1. A reply, as returned from the second node to the first node, can include information including PA1 and hints including V1 and HV1. The first node can perform processing to determine, using the information, whether C1 stored at PA1 was overwritten during a vulnerability window.

20 Claims, 19 Drawing Sheets

TECHNIQUES FOR PROVIDING DATA CONSISTENCY

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and one or more non-transitory computer readable media. The system can include one or more processors, and a memory comprising code that, when executed, performs the method. The one or more non-transitory computer readable media can include code stored thereon that, when executed, performs the method.

In at least one embodiment, the method can comprise: receiving, at a first of a plurality of nodes, a read I/O operation that requests to read current content stored at a target logical address LA, wherein the first node does not own LA and wherein a second of the plurality of nodes owns LA; and performing read processing for the read I/O operation, including: sending a first request from the first node to the second node that owns LA; in response to receiving the first request, the second node performing first processing including: performing address resolution processing using first mapping information for LA that maps LA to corresponding first content C1 stored at LA, wherein the first mapping information includes: i) a first physical address PA1 of a first data page P1 of a first physical large block (PLB) of non-volatile storage where C1 is stored in P1, ii) a first value V1 of a first generation identifier GenID1 of the first PLB and P1, and iii) a hash value field that includes a first hash value HV1 corresponding to C1; and returning a first reply from the second node to the first node, wherein the first reply includes first information comprising: i) PA1, and ii) first hints including V1 and HV1; and in response to receiving the first reply, the first node performing second processing including: using PA1 of the first reply, retrieving first current content stored at PA1; determining, using the first hints of the first information of the first reply, whether C1 stored at PA1 was overwritten with the first current content during a vulnerability window between a first point in time T1 when the first reply is returned by the second node and a second point in time T2 when the first node performs said retrieving that retrieves the first current content stored at PA1 using PA1 of the first reply, wherein said determining whether C1 stored at PA1 was overwritten with the first current content during the vulnerability windows includes performing data validation processing of the first current content with respect to C1 using the first hints; and responsive to determining that C1 stored at PA1 was not overwritten with the first current content during the vulnerability window such that the first current content is C1 and denotes valid content of LA, returning the first current content in response to the read I/O operation.

In at least one embodiment, V1 can denote a current value of GenID1 corresponding to the first PLB and all data pages of the first PLB at the first point in time T1. The current value of GenID1 can be incremented by 1 each time the first PLB is reclaimed by garbage collection processing for subsequent reuse in storing new content including overwriting any content stored in P1 located at PA1 within the first PLB. The first PLB can be included a first plurality of PLBs of back-end non-volatile storage. Processing can include performing said garbage collection processing on the first plurality of PLBs, wherein said garbage collection processing includes: moving first valid content of the first PLB to a second PLB of the first plurality of PLBs, wherein the first valid content includes C1, wherein as a result of said garbage collection processing, the first PLB is freed and available for reuse. After said garbage collection processing frees the first PLB, second content C2 can be stored at PA1 on the first PLB such that C2 overwrites C1. C2 can be stored in P1 located at PA1 of the first PLB after the second point in time T2 such that i) C1 as stored at PA1 is not overwritten with C2 by said storing during said vulnerability window, ii) C1 as stored in PA1 is overwritten with C2 by said storing after the first node performs said retrieving using PA1 of the first reply, and iii) C1 is the first current content; and wherein said determining whether C1 stored at PA1 was overwritten during the vulnerability window determines that C1 was not overwritten with the first current content during the vulnerability window. C2 can be stored in P1 located at PA1 of the first PLB during said vulnerability window such that C2 is the first current content; and wherein said determining whether C1 stored at PA1 was overwritten during the vulnerability window determines that C1 was overwritten with the first current content during the vulnerability window.

In at least one embodiment, during said vulnerability window, P1 located at PA1 may not be locked such that C1, as stored in P1, can be allowed to be overwritten with other content thereby invalidating P1 and PA1 with respect to LA such that PA1 does not reference current valid content of LA. Data validation processing can determine whether C1, as stored in P1 that is located at PA1 in the first PLB, has been overwritten by the first current content during the vulnerability window and thus invalidated with respect to LA. Data validation processing can include: receiving V2 denoting a GenID of P1 of the first PLB; determining whether V1 of the RPC reply equals V2; and responsive to determining that V1 does not equal V2, determining that C1, as stored in P1 located at PA1, has been overwritten with the first current content such that PA1 does not correspond to valid content of LA. V2 can be included in a page header associated with P1 of the first PLB.

In at least one embodiment, processing can include: calculating a second hash value HV2 for the first current content; determining whether HV1=HV2; and responsive to determining that HV1 does not equal HV2, determining that C1, as stored in P1 located at PA1, has been overwritten with the first current content such that PA1 does not correspond to valid content of LA. Responsive to determining that i) HV1=HV2 and ii) V1=V2, it can be determined that C1, as stored in P1 located at PA1, has not been overwritten by the first current content such that i) PA1 corresponds to valid content of LA, and ii) the first current content is C1.

In at least one embodiment, in said second processing, responsive to determining that C1 stored at PA1 was overwritten by the first current content during the vulnerability window, additional processing can be performed that includes: sending a second request from the first node to the second node that owns LA; in response to receiving the second request, the second node performing third processing including: performing address resolution processing using second mapping information for LA that maps LA to C1 stored at LA, wherein the second mapping information includes i) a second physical address PA2 of a second data page P2 of a second PLB of non-volatile storage where C1 is stored in P2, ii) a second value V2 of a second generation identifier GenID2 of the second PLB and P2, and iii) HV1 corresponding to C1; and returning a second reply from the second node to the first node, wherein the second reply includes second information comprising: i) PA2, and ii) second hints including V2 and HV1; and in response to receiving the second reply, the first node performing fourth processing including: using PA2 of the second reply, retrieving third content C3 stored at PA2; determining, using the second hints of the second information of the second reply, whether C1 stored at PA2 was overwritten with C3 during a second vulnerability window between a third point in time T3 when the second reply is returned by the first node and a fourth point in time T4 when the second node retrieves C3 stored at PA2 using PA2 of the second reply, wherein said determining whether C1 stored at PA2 was overwritten with C3 during the second vulnerability windows includes performing data validation processing of C3 with respect to C1 using the first hints; and responsive to determining that C1 stored at PA2 was not overwritten with C3 during the vulnerability window such that C3 is C1 and denotes valid content of LA, returning C3 in response to the read I/O operation.

In at least one embodiment, retrieving the first current content stored at PA1 can include: reading a compressed form of the first content from PA1; and decompressing the compressed form of the first content.

In at least one embodiment, a second method can comprise: receiving, at a storage system, a write I/O that writes first content C1 to a logical address LA; responsive to said receiving said write I/O, performing first processing including: determining a modified version of C1 including replacing first data of C1 with a first value V1 of a first generation identifier GenID1 of a first physical large block (PLB) of storage such that V1 is embedded within the modified version of C1; storing the modified version of C1 at a first physical address PA1 of a first page P1 of storage of the first PLB, wherein V1 is included in the modified version of C1 at a first location or position of P1; and updating first mapping information that maps LA to PA1, wherein after said updating, the first mapping information includes: i) PA1 indicating that current content of LA is stored at PA1, ii) V1 denoting a current generation of the first PLB and P1 at a point in time corresponding to when said storing is performed, iii) a first hash value HV1 corresponding to C1, and iv) the first data of C1 that is replaced with V1 in the modified version of C1; receiving, at a first node of the storage system, a read I/O requesting to read current contents of LA, wherein the first node does not own LA and wherein LA is owned by a second node of the storage system; and responsive to said receiving the read I/O, performing third processing including: sending a first request from the first node to the second node that owns LA; in response to receiving the first request, the second node performing first processing including: performing address resolution processing using the first mapping information for LA; and returning a first reply from the second node to the first node, wherein the first reply includes first information comprising: i) PA1, and ii) first hints including V1, HV1, and the first data; and in response to receiving the first reply, the first node performing fourth processing including: using PA1 of the first reply, retrieving first current content of P1 stored at PA1; determining, using the first hints of the first information of the first reply, whether the modified version of C1 stored at PA1 was overwritten with the first current content during a vulnerability window between a first point in time T1 when the first reply is returned by the second node and a second point in time T2 when the first node performs said retrieving that retrieves the first current content stored at PA1 using PA1 of the first reply; and responsive to determining that modified version of C1 stored at PA1 was not overwritten with the first current content during the vulnerability window such that the first current content is C1 and denotes valid content of LA, returning a restored version of the first current content in response to the read I/O operation.

In at least one embodiment of the second method, determining whether C1 stored at PA1 was overwritten with the first current content can include: extracting a current generation value for P1 from the first location or position of the first current content; determining whether the current generation value for P1 matches V1 as returned in the first reply; and responsive to determining that the current generation value does not match V1, determining that the modified version of C1 stored at PA1 was overwritten with the first current content during the vulnerability window. Determining whether C1 stored at PA1 was overwritten with the first current content can include: responsive to determining that the current generation value matches V1, performing restoration processing to restore P1. Restoration processing can include generating restored content of P1 including copying the first data of the first reply to the first location or position of the first current content. Determining whether C1 stored at PA1 was overwritten with the first current content can include: computing a second hash value HV2 for the restored content; determining whether HV2 matches HV1 of the first reply; and responsive to determining that HV2 does not match HV1, determining that the modified version of C1 stored at PA1 was overwritten with the first current content during the vulnerability window. Determining whether C1 stored at PA1 was overwritten with the first current content can include: responsive to determining that HV2 matches HV1, performing other processing including: determining that the modified version of C1 stored at PA1 was not overwritten with the first content during the vulnerability window; and performing said returning that returns the restored content as the restored version of the first current content in response to the read I/O operation, wherein the restored version of the first content is C1. Storing the modified version of C1 at PA1 of P1 of the first PLB can store the modified version of C1 in an uncompressed form.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
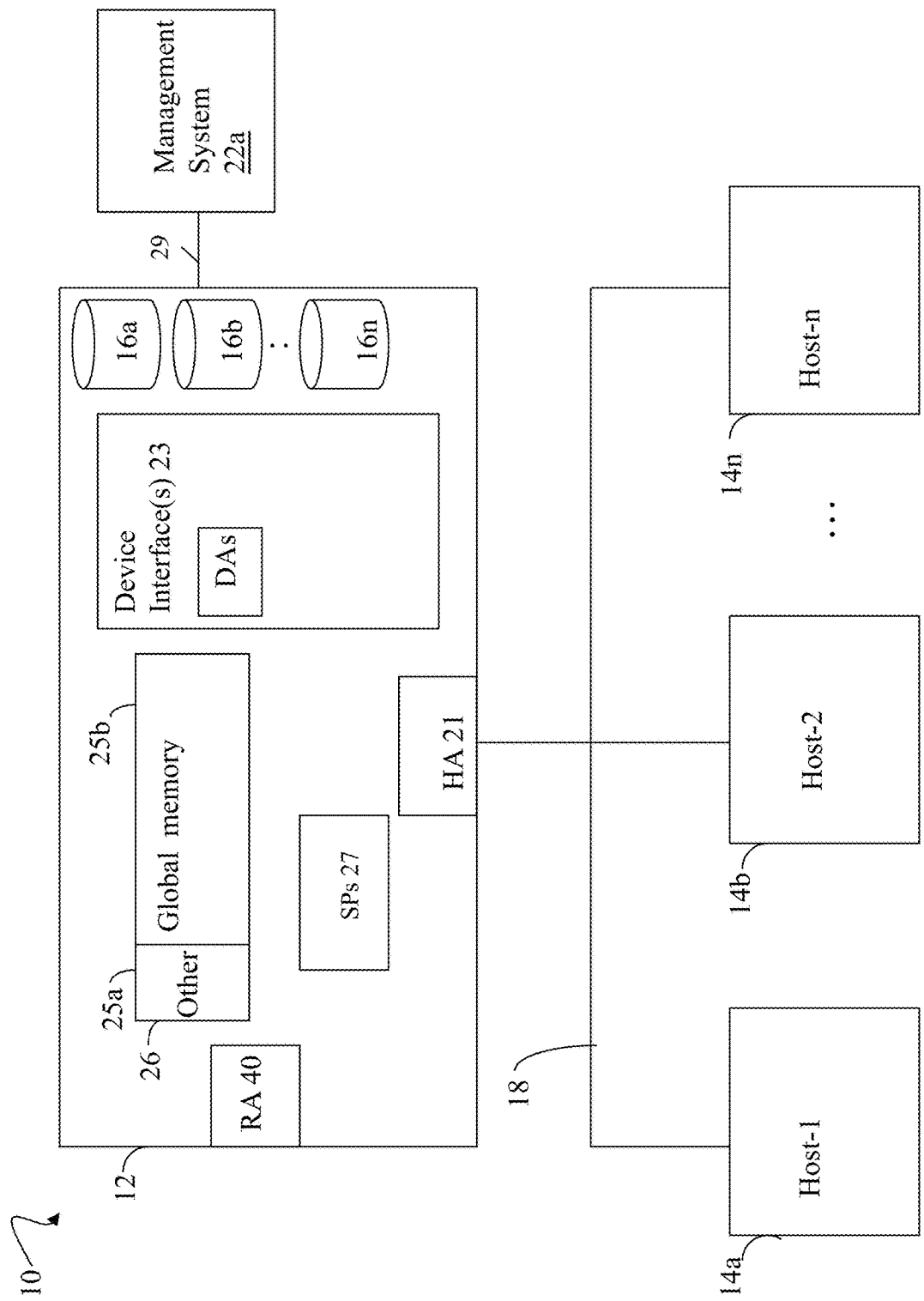
FIG. 1 is an example of components that may be included in a system in accordance with the techniques of the present disclosure.

A system, such as a storage system, can include multiple processing nodes. Each of the multiple processing node can receive and service I/O operations (sometimes referred to simply as I/Os). An I/O operation can be, for example, a read operation that reads content from a logical address, or a write operation that writes content to a logical address. In at least one embodiment, mapping information can be used to map a logical address, such as specified in an I/O operation, to a corresponding physical storage location or address that stores the user data or content of the logical address. The mapping information can include a chain of metadata (MD) pages traversed to obtain a logical address's content from its corresponding physical storage location or address on back-end (BE) non-volatile storage.

In such a system with multiple processing nodes that can service I/Os, the multiple nodes can have access to the same MD and the same user data or content stored at logical addresses. Due to the shared access of user data and MD among the multiple processing nodes, a synchronization or control mechanism can be used to coordinate access of the shared used data and MD among the nodes. For example, a locking technique can be used synchronize or generally coordinate access among the shared data and MD among the nodes. As another example, a technique can be used which provides a strong separation of responsibilities between the nodes in connection with the shared data and MD.

In at least one embodiment, an architecture can be utilized which partitions ownership of a logical address space of user data or content among the multiple processing nodes of the storage system. For example, the logical address space can correspond to one or more volumes, or more generally, one or more storage objects. The storage objects can include logical devices or volumes, files, file systems, directories, and/or sub-portions of such storage objects.

In at least one embodiment, a node assigned a particular logical address, or a subrange of logical addresses, can be designated as the sole owner, respectively, of the logical address or subrange. In at least one embodiment, a node which owns the logical address can perform address resolution processing (sometimes referred to herein as simply resolution processing) for the logical address using the mapping information of MD pages and can traverse the chain of MD pages to obtain content or data stored at the logical address.

In at least one embodiment, the logical address space can be partitioned or divided into slices where each slice corresponds to a sub-volume logical address portion. In this manner, a volume or logical device, or more generally a storage object, can have an associated logical address space which is partitioned into multiple slices. Each such slice can be assigned to a single one of the nodes as the slice's owner.

In connection with discussion herein, a node receiving an I/O operation, such as a read I/O, can sometimes be referred to as the initiator node with respect to the particular I/O operation received at the initiator node.

In at least one embodiment, when a read I/O directed to a logical address LA is received by a non-owner node that does not own LA, the non-owner initiator node can issue a request such as a remote procedure call (RPC) to the owner node to perform processing including resolution processing using mapping information of MD pages associated with the LA. The owner node can then perform resolution processing for LA using the mapping information to obtain a reference, address or pointer that can be used to access the content C1 stored at LA. In at least one embodiment, the reference, address or pointer used to access C1 can be a physical storage location or address on BE non-volatile storage where C1 is stored. The owner node of LA can return a response or reply to the non-owner initiator node, where the response or reply can include the address or reference used to access the desired content C1. The non-owner initiator node can then use the returned address or reference to access C1 from a physical storage location on BE non-volatile storage. The initiator node can then return C1 to the client that issued the read I/O.

In at least one embodiment, the mapping information can include a multi-level tree or hierarchical structure of MD pages. In at least one embodiment, the number of levels in the tree or structure can be three or more. In at least one embodiment, the tree can be a B+ tree data structure where each non-leaf node can include up to N children. Thus, N can be a specified maximum allowable number of child nodes and N can be 2 or more.

In at least one embodiment in which the mapping information includes a 3 level tree of MD pages, each slice, which is owned by one of the nodes, can correspond to a logical address space subrange associated with a MD leaf page of the tree. The tree can also include a mid MD page level of mid MD pages and a top MD page level of top MD pages. Each mid MD page can include addresses of, or pointers to, MD leaf pages. Each top MD page can include addresses of, or pointers to, MD mid pages.

In at least one embodiment, the storage system can include two nodes and a logical address space can be partitioned into two sets of slices, where each slice set is owned by only a single one of the nodes. The logical address space can be partitioned into consecutive slices which correspond to consecutive, contiguous sequential logical address subranges of the logical address space. The slices can be assigned a unique integer identifier or ID such as beginning with one (1), where even slices can be included a first slice set owned by node A, and where odd slices can be included in a second slice set owned by node B. Each slice can correspond to a logical address subrange size such as 2 MBs. In at least one embodiment, each MD page of the tree of mapping information can include 512 entries, where each entry is a pointer or address. Each non-leaf MD page entry can be a pointer to, or address of, another MD page. Each leaf MD page entry can include a pointer to, or address of, an entry in a VLB (virtual layer block) page. In such an embodiment where each MD leaf corresponds to a 2 MB logical address space portion, each MD leaf entry can correspond to a 4K page of content or stored user data. Each MD leaf entry can include the address of a VLB entry, where the VLB entry further includes another pointer to or address of non-volatile storage containing the content or user data.

In at least one embodiment resolution processing or address resolution processing for LA can use mapping information that includes a VLB page where a MD leaf page entry of the mapping information references a VLB entry of the VLB page, and the VLB entry can further reference a physical location on BE non-volatile storage. In at least one embodiment, the MD leaf page entry of the mapping information for LA can include the address of the VLB entry which further includes information used, at least in part, to determine a reference or pointer to, or an address of, a physical location on BE non-volatile storage of C1.

In further detail in at least one embodiment, address resolution processing performed by a node that owns the logical address LA can include traversing the chain of MD pages of mapping information which maps LA to a corresponding physical address PA1 including C1 stored at LA. In particular in at least one embodiment, the resolution processing performed by the node traverses the chain of MD pages (e.g., MD top, MD mid, and MD leaf pages) until an entry E11 of a MD leaf is reached where E11 includes a VLB address, V1, which points to, or is an address of, an entry E12 of a target VLB, VLB1. In at least one embodiment, the VLB address V1 (e.g., address of VLB entry E12) can be characterized as an indirect address, pointer or IDP determined by the node as part of address resolution processing for LA. The VLB entry E12 can then include information used to determine a PLB (physical large block) address, PA1, where C1 is stored at PAL. In such an embodiment, resolution processing for LA can include reading the VLB entry E12, where information of E12 is used to determine the PLB address PA1. PA1 can be then be used to read or access C1 stored at the address PA1 on BE non-volatile storage.

In at least one embodiment in connection with a read I/O operation requesting to read content for logical address LA where the read I/O is received, from a host, by a non-owner node that does not own LA, the corresponding read I/O workflow can include performing the following sequence of operations: i) the non-owner node receives the read I/O to read the content of LA; ii) the non-owner node can send an RPC to the owner node of LA as noted above; iii) in response the owner node can traverse a corresponding chain of MD pages of mapping information to map LA to PA1, the physical address or location of the content C1 stored at LA; iv) the owner node can return, to the non-owner node, PA1, the pointer or address PA1 that identifies a physical address or location of the content C1 stored at LA; v) the non-owner node can then retrieve C1 using PA1; and v1) the non-owner node can return C1 to the host. In at least one embodiment, the pointer or address, PA1, returned to the non-owner node can be a PLB pointer or address, where the PLB pointer or address identifies a physical address or location in a PLB of BE non-volatile storage.

One problem that can occur in connection with the above-noted read I/O operation workflow is that the PLB pointer or address, PA1, returned by the owner node to the non-owner initiator node may not be protected by any lock within the time interval or window between the steps iv) and v). Thus the foregoing time interval or window can denote a vulnerability window within which the physical storage location having the physical address PA1 can be updated or invalidated by another process or thread performing another workflow thereby resulting in the non-owner node reading incorrect or invalid data (e.g., data corruption) in the step v) of the above-noted read I/O workflow.

A straightforward solution to prevent the storage location with the address PA1 from being overwritten can be to use a lock such that the storage location having address PA1 is locked until the non-owner initiator node reads the content C1 stored at PA1 and acknowledges to the owner that the pointer or address PA1 is no longer in use. However, implementation of the foregoing solution requires extra exchanges and interactions between the nodes and can significantly and undesirably increase the time of lock holding. Additionally, such an approach using the foregoing straightforward solution can have additional drawbacks such as adversely impacting overall system performance and/or increasing the complexity of corresponding workflows.

Accordingly, described in the following paragraphs are techniques that can be performed to overcome at least the above-noted drawbacks. In at least one embodiment, the techniques of the present disclosure provide for read I/O consistency in an efficient manner without incurring the additional per-I/O computational costs, adverse performance impacts and increase in workflow complexity of the above-noted solution using locks.

In at least one embodiment, the storage system can utilize a log-structured architecture or system (LSS). The storage, such as the BE non-volatile storage, where the data or contents of corresponding logical addresses is stored can be in accordance with an LSS. Generally, an LSS can be characterized by allowing new writes to be directed to free or unused storage on a data storage device, and by performing garbage collection (GC) that allows holes of storage including unused or invalid data to be compacted and reused. In an LSS, as newly written data provides updated values for existing data stored at a logical address, the newly written data can be stored at a new physical address or location on BE non-volatile storage rather than overwriting or performing an "in place" update of a first storage location on BE non-volatile storage, where the first storage location contains the existing data of the logical address. After writing the new data to the logical address, where the new data is stored at the new physical address or location, the existing data stored at the first storage location can be old, stale or invalid. The LSS can perform GC processing to reclaim the first storage location containing the stale, invalid data. As a result of performing GC processing, the first storage location can reclaimed, freed and made available for reuse such as, for example, for storing other content or data written to another logical address.

Modern data storage systems can implement an LSS. The LSS as implemented by a data storage system can have its own components, for example, to maintain a log, to perform logical to physical address translation using its own metadata (e.g., such as the chain of MD pages of the mapping information noted above), to perform GC processing, to perform storage management controlling data placement, to perform metadata management, and the like. Additionally in at least one embodiment, a data storage system can also utilize non-volatile BE storage which includes one or more non-volatile solid state storage devices or SSDs. In an LSS in at least one embodiment, newly written content to a logical address can be written to a new physical storage location on the BE SSDs. As noted above, the new content replaces the existing content of the logical address, where the existing content can be stored at another BE SSD storage location that is different from the new physical storage location of the newly written content of the logical address.

Processing can include the LSS of the storage system storing newly written content to a logical address at a new physical address or location each time there is an update or write to the logical address. As needed or desired, GC processing can then be performed to reclaim storage of stale invalid content, where the reclaimed storage can be freed and available for reuse. The GC processing performed by the storage system can include data movement or copying of valid content between BE storage chunks or portions in efforts to create or generate free BE storage chunks or portions for re-use. Although data stored at logical addresses can be written at a first point in time to sequentially contiguously located BE storage locations, as existing data of logical addresses is replaced with newly written content, existing data can become stale and invalid and can create holes of invalid data portions interspersed among valid data portions. As a result, GC processing can be performed to consolidate such valid data portions from multiple storage chunks also including invalid data portions to result in obtaining one or more free storage chunks. For example, GC processing can use two source chunks partially populated with valid content and a single target chunk that is completely free (e.g., storage of entire chunk is free and unused). GC processing can combine the valid content from the two source chunks and store the collective valid content of the two source chunks in the single target chunk, thereby generating one net free chunk. Thus, such GC processing can include writing, copying or moving the valid content of the source chunks to the corresponding single target chunk to consolidate valid content and free storage of the entire two source chunks for reuse. As another example, GC processing can be performed with respect to a single chunk of storage that is partially populated with valid content interspersed between holes of invalid content. GC processing can include consolidating or compacting the valid content such that the valid content is collectively stored at consecutive locations beginning at one end of the single chunk. In this manner, the remaining storage of the single chunk can denote a contiguous portion of storage of the single chunk that can be reused for storing new content.

In at least one embodiment of a storage system implementing an LSS, PLB overwrite or invalidation of a storage location pointed to by PA1, such as between the time window of steps iv) and v) of the read I/O workflow noted above, can occur as a result of GC processing. For example, if PA1 denotes an address in a source chunk noted above, where the source chunk is reclaimed and reused, the storage location having address PA1 in the source chunk can then be overwritten with new data corresponding to a different logical address such that PA1 no longer points to the expected correct valid content or data corresponding to the logical address LA. As another example, PA1 can be an address in the target chunk, where storage of PA1 has been reclaimed and is then overwritten during GC processing. More generally in at least one embodiment during the time window or interval or vulnerability window of the read I/O workflow noted above, GC processing can result in reclaiming the storage of PA1 where PA1 is then overwritten with new content that overwrites existing valid content C1 of a corresponding logical address LA.

In at least one embodiment, the techniques of the present disclosure maintain and utilize a set of hints that can be used to verify data or content read using a corresponding PLB pointer or address, such as PA1, in connection with the read I/O workflow. In at least one embodiment, such hints can be used in connection with data verification and recognizing when data or content read, using a PLB pointer or address returned in connection with an RPC reply or response, was overwritten such as a result of GC processing or other data. As a result of using the hints and recognizing that the data or content of the logical address LA as read using the PLB pointer has been overwritten, data verification or validation can fail. In at least one embodiment in response to the non-owner initiator node determining data verification or validation failure (e.g., data invalidation determined) with respect to the content or data of LA read using the PLB pointer returned in the RPC response, the non-owner initiator can issue another RPC request to the owner node for the same logical address LA thereby resulting in repeating steps ii), iii) and iv) of the above-noted read I/O workflow and returning a new PLB pointer. Additionally in at least one embodiment, the non-owner initiator node can then repeat step v) of the read I/O workflow to read new content using the newly returned PLB pointer. The non-owner initiator node can then repeat performing processing for data verification or validation of the new content using the hints. In at least one embodiment, repeating the foregoing steps ii), iii) and iv) is expected to result in obtaining the new PLB pointer that is now valid and points to the correct expected valid content C1 of the corresponding logical address LA. In at least one embodiment, the information included in the RPC reply can be included in the mapping information used to map a corresponding logical address, LA, to content C1 stored at LA. In at least one embodiment, the information of the RPC reply included in the mapping information associated with LA can include PA1 and the hints of the RPC reply.

In at least one embodiment where the content C1 is stored at the logical address LA, if GC processing moves or relocates the content C1 from the physical address or location PA1 to another second physical address or location PA2, additional processing can also be performed to update all references to the content C1 to now reference PA2. In at least one embodiment PA2 can be another PLB address in BE non-volatile storage. In at least one embodiment as a result of GC processing, one of the references updated can include a corresponding MD page entry, such as a VLB page entry that is updated to include PA2 rather than PA1. So in at least one scenario in at least one embodiment, a first RPC request can result in the owner node of LA performing address resolution processing at a first point in time using a VLB page that includes PAL. At the first point in time, the content C1 may have been moved from PA1 to PA2, and also PA1 may have been overwritten or reused for storing new content NEW corresponding to another different logical address other than LA. At the first point in time, the VLB page may also not yet be updated from PA1 to PA2 such that the VLB page still includes PAL. As a result at the first point in time, the owner node returns PA1 to the non-owner initiator node in response to the first RPC. The initiator node then uses PA1 to read content for the logical address LA. However, the invalid content NEW is stored at PA1 and is detected as invalid content for LA as a result of a data validation failure using the hints in accordance with the techniques of the present disclosure. Repeating the processing using a subsequent second RPC request can include the initiator node issuing the second RPC request to the owner node of LA where the owner node repeats address resolution processing for LA at a second point in time using the updated VLB page that includes PA2 rather than PA1. Thus in at least one embodiment, between the first and second points in time, the VLB page can be updated to now include the new physical location or address PA2 where C1 is stored. As a result at the second point in time, the owner node returns PA2 to the non-owner initiator node in response to the second RPC. The initiator node then uses PA2 to read the expected valid content C1 as detected by the successful data validation using the hints.

Thus in at least one embodiment, the techniques of the present disclosure can be used to provide data consistency in a dual node active-active storage system that implements an LSS where both nodes can receive and service I/Os.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like.

Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
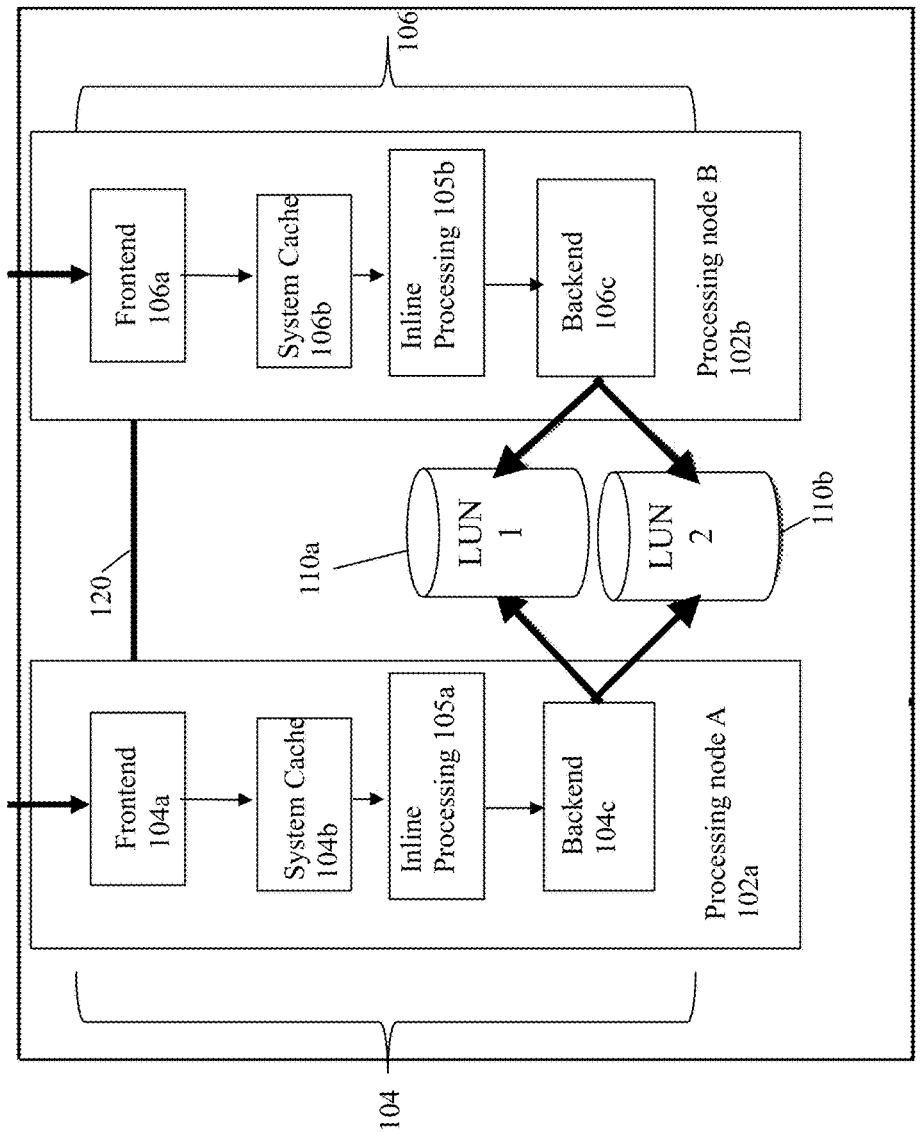
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
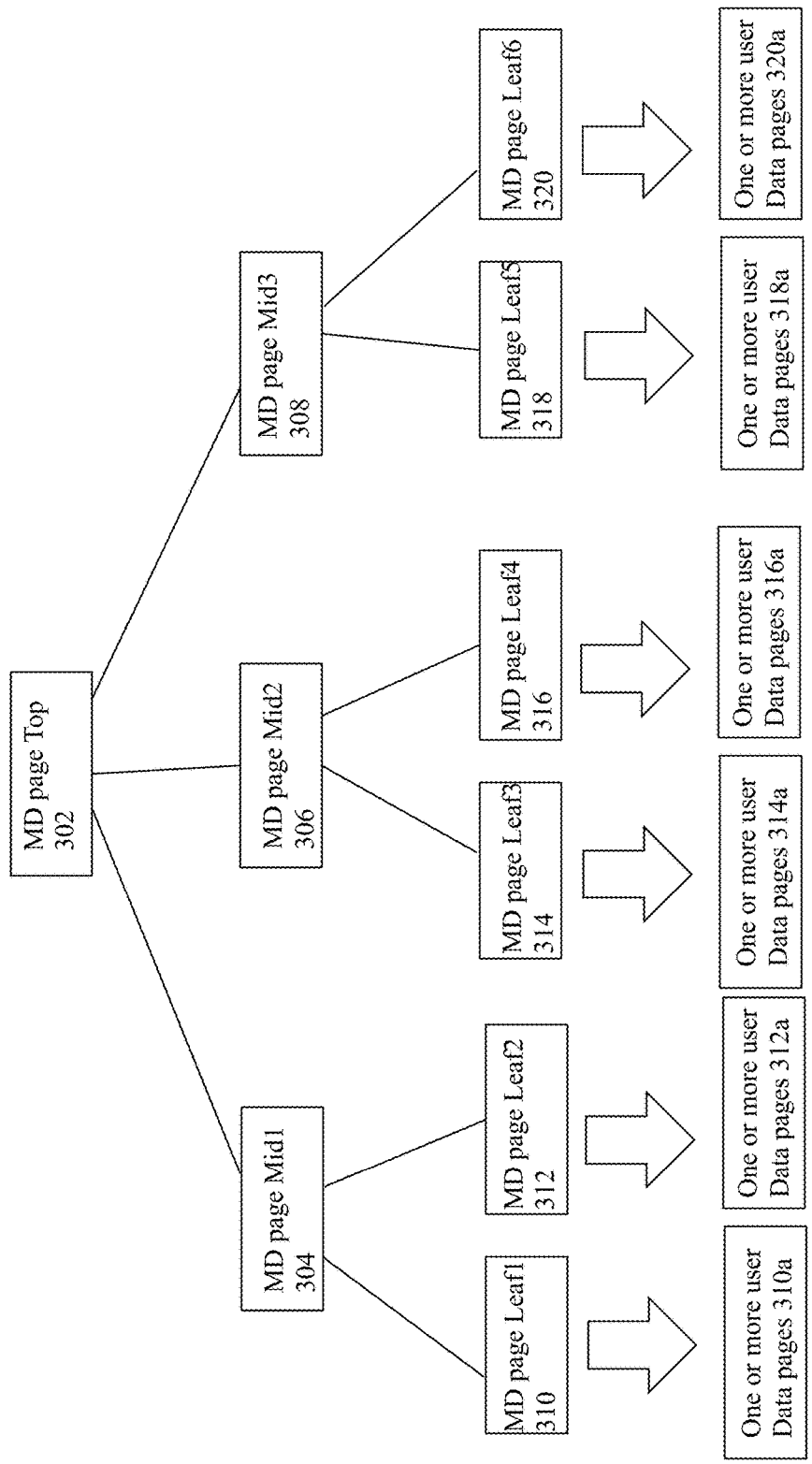
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
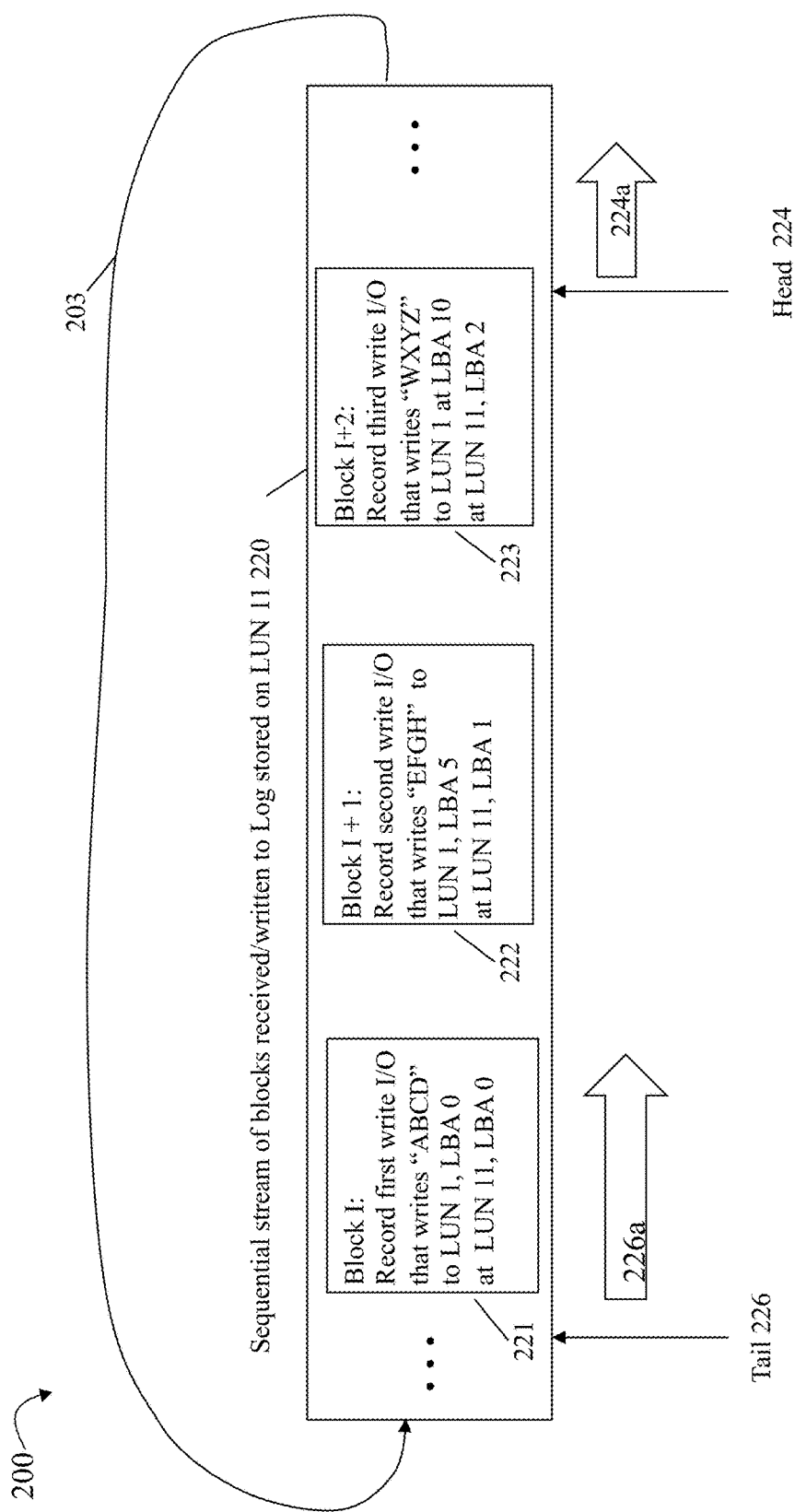
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
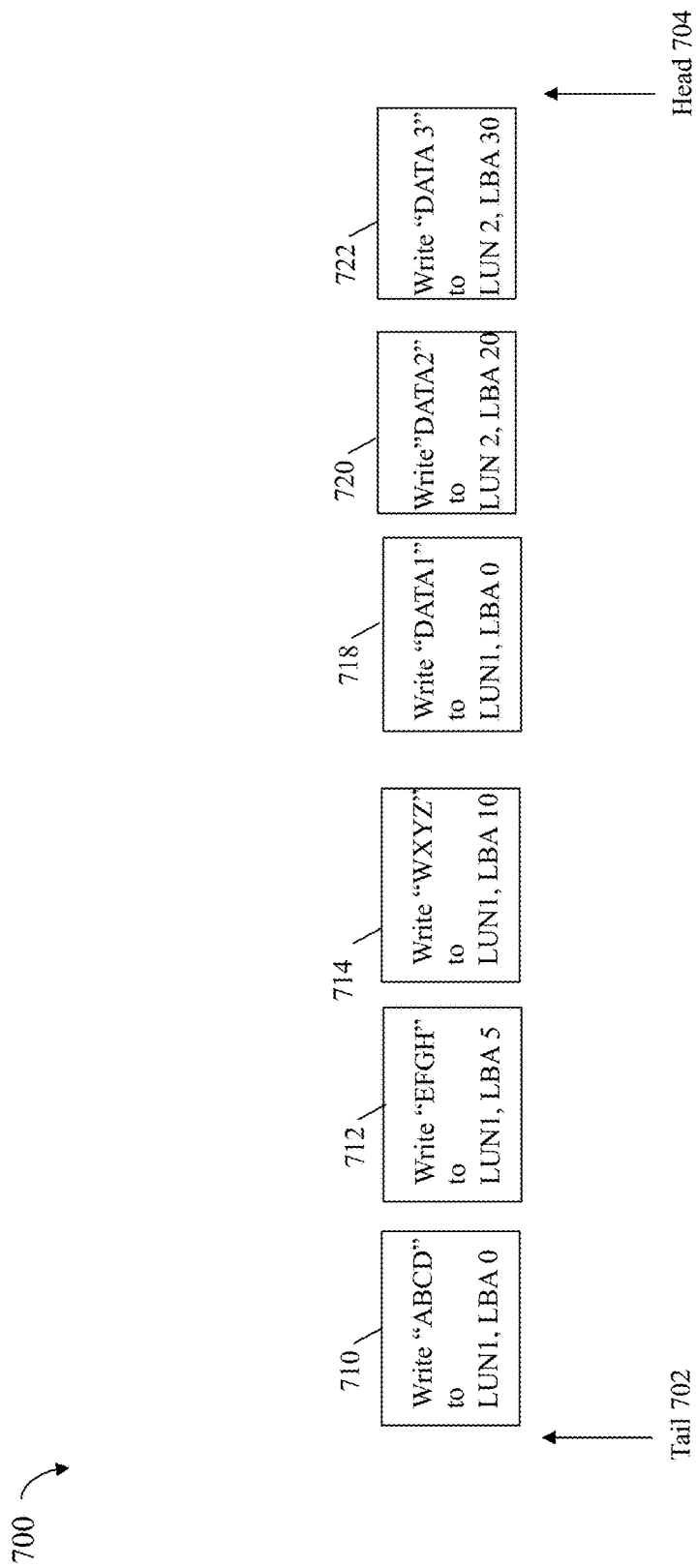

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
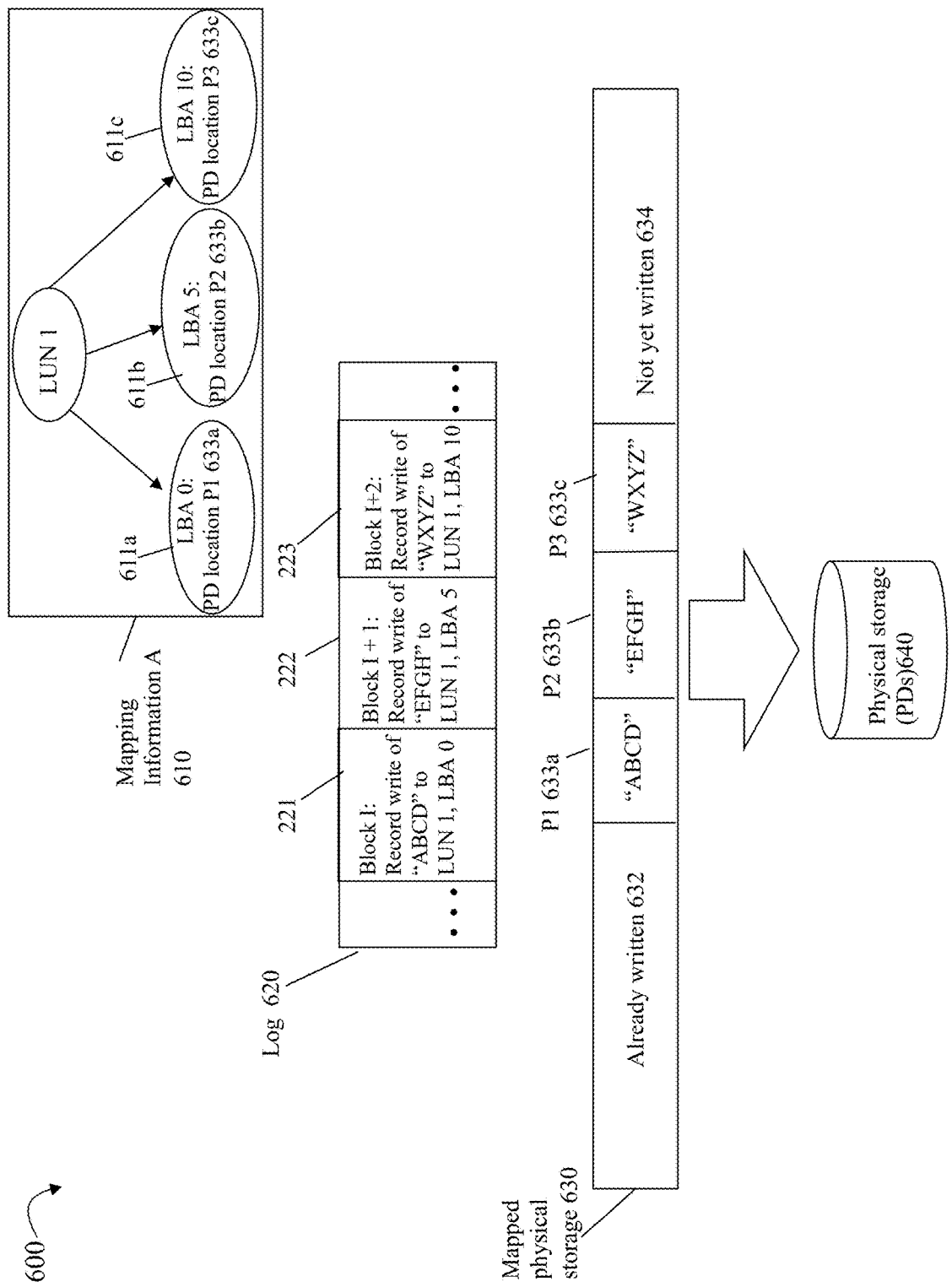

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

A depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
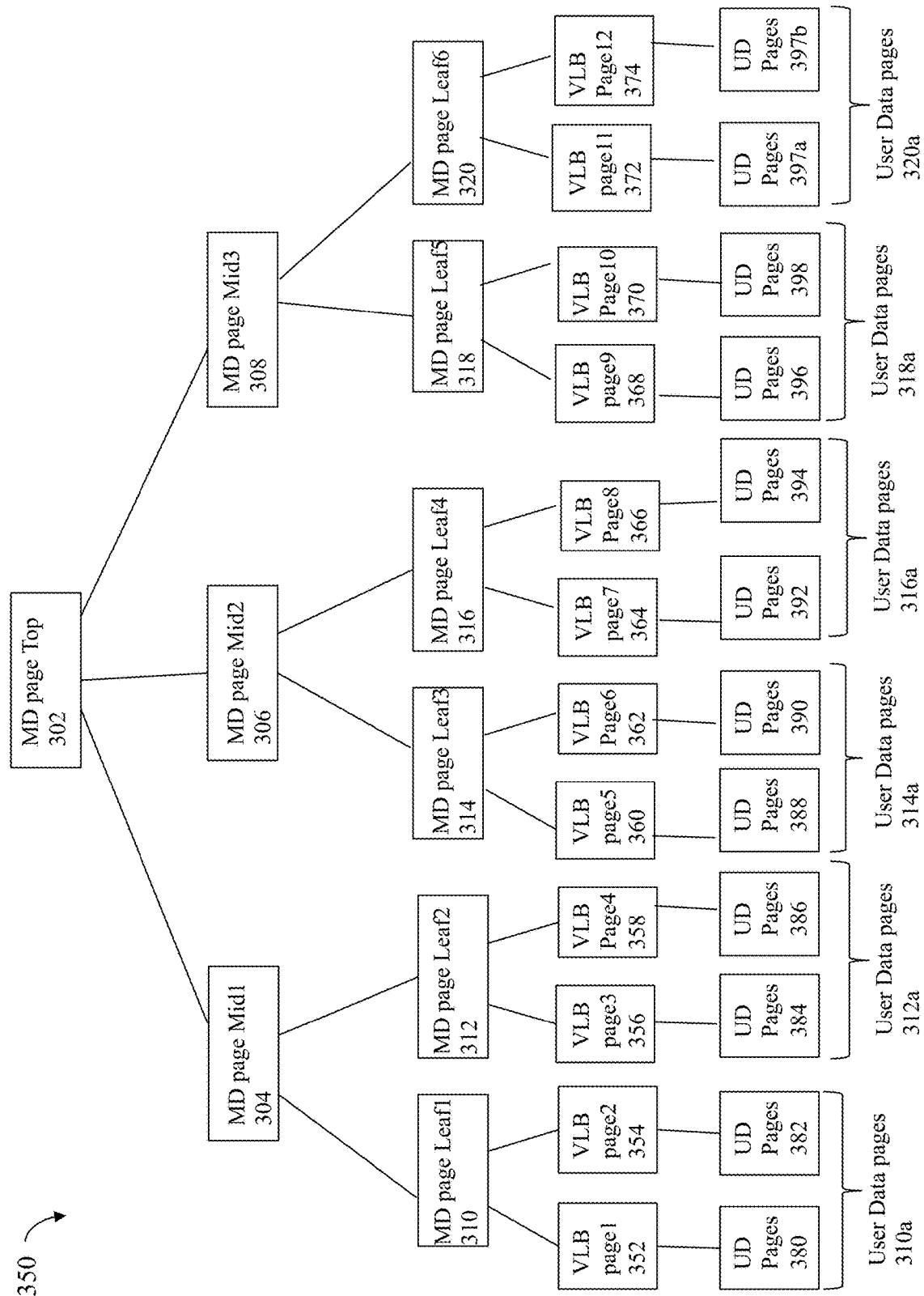

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
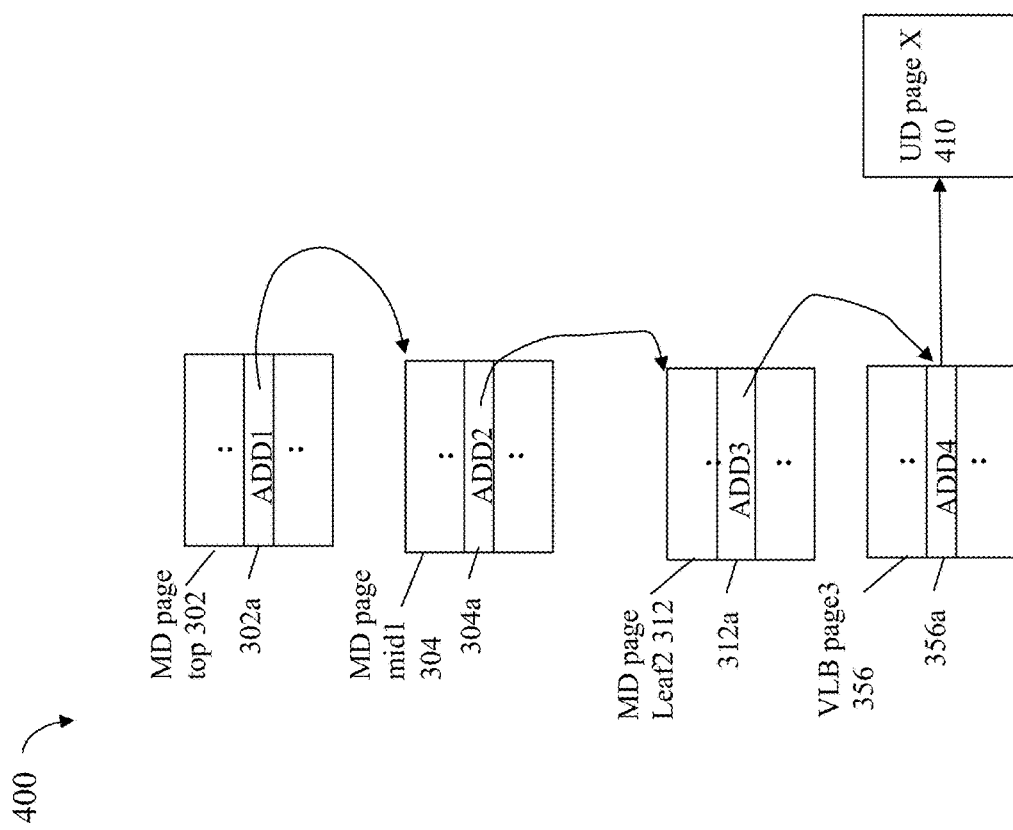

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the particular mid level MD page, such as MD page mid1 304, that is accessed next in the sequence.

Continuing with the example 400, the MD page mid1 304 can be accessed where the location 304a is read to obtain the address or pointer ADD2 from location 304a. In at least one embodiment, the particular entry or offset 304a of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies the MD page leaf 2 312. If the MD page 312 is not already in cache, the on-disk copy of the MD page 312 on a PD can be read to obtain the content of location 312a. In at least one embodiment, the particular desired entry or offset 312a of the MD leaf2 page 312 can be determined based on the logical address being mapped. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
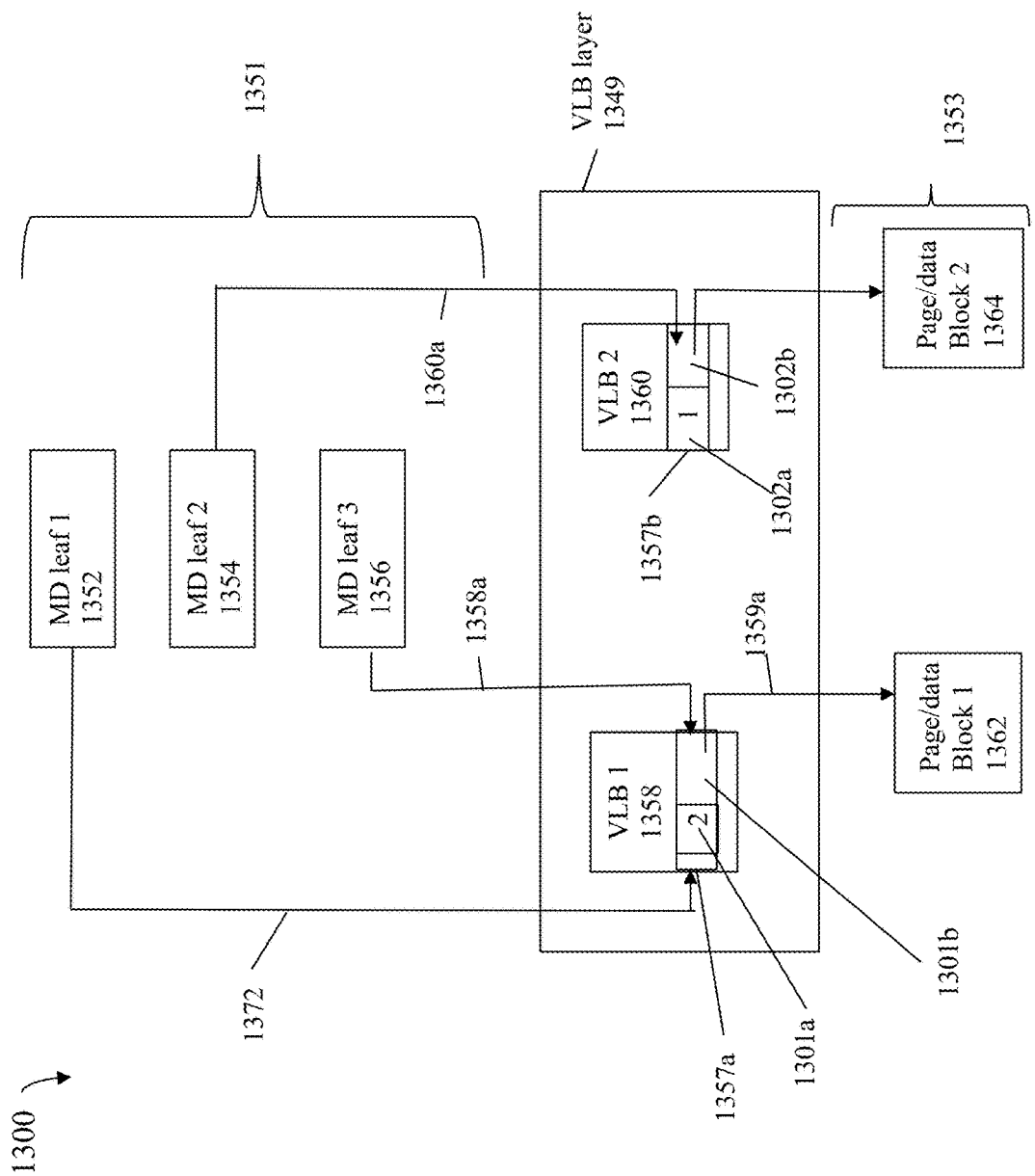

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include the fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include the fields 1302a and 1302b. The field 1302b can be a pointer to, or address of, the user data block 1364. The field 1302a can be a reference count or counter indicating the number of instances of, or references to, the particular data block 1362 (e.g., data block pointed to by 1302b).

The reference count 1301a can be initialized to 1 when a first or initial instance of the associated data block 1362 is stored. In this example, the reference 1301a is 2 indicating that there are 2 instances of the data block 1362 and thus 2 references to the data block 1362. In this case, the are 2 instances of the data block 1362 in stored user data. The instances denoted by the reference count 1301a include all deduplicated instances corresponding to entries of the MDL leaves 1352, 1356 that respectively point 1372, 1358a to the VLB entry 1357a associated with the single copy of the data block 1362.

The reference count 1302a can be initialized to 1 when a first or initial instance of the associated data block 1364 is stored. In this example, the reference 1302a is 1 indicating that there is 1 instance of the data block 1364 and thus 1 reference to the data block 1364. The instances denoted by the reference count 1302a generally include any/all deduplicated instances associated with the single copy of the data block 1364. However, in this example, there is only a single reference to, and single instance of, the data block 1364 in stored user data. In particular, the MD leaf 1354 references or points (1360a) to the VLB entry 1357b associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

In at least one embodiment, each MD leaf can have multiple entries, such as 512 entries, each corresponding to a different logical address in a logical address range corresponding to the MD leaf.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

Workflows for some implementations to perform reads and writes to the MD page can include loading the entire MD page into the cache or volatile memory of a node, if the MD page is not already in the cache or volatile memory of the node.

A data storage system can perform different data services such as data deduplication discussed above to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6 and discussion above regarding FIG. 6. In at least one embodiment using the MD structures as described, for example, in connection with FIGS. 3, 4, 5, and 6, the reference count associated with a data block can be included in an entry of a VLB page associated with the data block. For example with reference to FIG. 6, the VLB entry 1357a includes a field 1301a with the reference count=2 for the associated data block 1362; and the VLB entry 1357b includes a field 1301a with the reference count=1 for the associated data block 1364.

The reference count such as of the VLB entries 1357a, 1357b, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy of the data block.

Consistent with other discussion herein in at least one embodiment, updates or modifications can be with respect to user data or stored content modified by client or host write I/Os as well as with respect to metadata, such as updates or modifications to the MD structure or mapping information described above. As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing.

Garbage collection or GC can be performed in connection with storage management of the BE PDs to reclaim and reuse free or invalidated physical storage as new data is written. In some cases, "holes" of storage storing old, unused or invalid content can be interspersed among portions of storage storing current valid content. Garbage collection can include performing processing which allows multiple holes of storage including unused or invalid data to be compacted into a single larger contiguous storage portion which can then be reused. Thus garbage collection processing can include moving first storage portions of valid data or content interspersed among holes of invalid content from a source to a target location to thereby make free or available a larger contiguous storage portion including the holes of invalid content.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the UD log can include updating the corresponding MD pages which map the logical address to its corresponding BE PD location including the content stored at the logical address. In at least one existing system, the mapping information including MD pages as described herein can thus be updated. For example, such updating of the mapping information can include updating any of the top, mid and leaf MD pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, and leaf MD page. The mapping information can also include a VLB where a MD leaf page entry can reference a VLB entry, and the VLB entry can reference a physical location on BE non-volatile storage.

In at least one embodiment, a user data (UD) or client logical address, which can be the target logical address of a client I/O operation such as a read operation, can be uniquely identified using the volume or LUN ID (identifier), or more generally a storage object or resource ID, in combination with the LBA or offset of the logical address.

The techniques of the present disclosure are described below in an exemplary embodiment of a dual node active-active data storage system or cluster where the two nodes are connected by a network link or connection as discussed above. However more generally, the techniques of the present disclosure can be used in connection with a data storage system including more than two nodes, and generally any suitable number of multiple nodes.

In at least one embodiment, a PLB can denote the chunk or portion of storage of a particular size that can vary with embodiment. In at least one embodiment, a PLB as used herein can generally denote a chunk or portion of BE non-volatile storage that can be used to store multiple pages of user data (UD) or content of corresponding logical addresses. In at least one embodiment, a single PLB can denote the granularity that UD pages are written out to BE non-volatile storage. In at least one embodiment, UD pages of a single PLB can be buffered and accumulated such as in memory, and then the single PLB of UD pages can be written out to BE non-volatile storage. In at least one embodiment, content or UD of particular logical address LA can be stored at a physical address or location PA1 on BE non-volatile storage denoted by a particular offset or location within a particular PLB. For example in at least one embodiment, PA1 can be represented by a) PLB address or pointer; and b) an offset or position within the PLB. Additionally, in at least one embodiment, a length can be specified denoting the size or length of the content as stored in the PLB.

In at least one embodiment, GC processing can operate on storage chunks that are PLBs. For example, as discussed elsewhere herein, GC processing can move valid data or content from two source chunks (that are partially populated with both valid and invalid or stale content) to a single target chunk of free or unused storage. In such an embodiment, the valid content of the two source storage chunks cannot exceed 100% or the size of free storage on the target chunk. The two source chunks and the target chunk can be storage chunks of BE non-volatile storage, where each of the two source chunks and the target chunk correspond to a single PLB.

Consistent with other discussion herein, a system, such as a storage system, can include multiple processing nodes. Each of the multiple processing node can receive and service I/O operations (sometimes referred to simply as I/Os). An I/O operation can be, for example, a read operation that reads content from a logical address, or a write operation that writes content to a logical address. In at least one embodiment, mapping information can be used to map a logical address, such as specified in an I/O operation, to a corresponding physical storage location or address that stores the user data or content of the logical address. The mapping information can include a chain of metadata (MD) pages traversed to obtain a logical address's content from its corresponding physical storage location or address on back-end (BE) non-volatile storage.

In such a system with multiple processing nodes that can service I/Os, the multiple nodes can have access to the same MD and the same user data or content stored at logical addresses. Due to the shared access of user data and MD among the multiple processing nodes, a synchronization or control mechanism can be used to coordinate access of the shared used data and MD among the nodes. For example, a locking technique can be used synchronize or generally coordinate access among the shared data and MD among the nodes. As another example, a technique can be used which provides a strong separation of responsibilities between the nodes in connection with the shared data and MD.

In at least one embodiment, an architecture can be utilized which partitions ownership of a logical address space of user data or content among the multiple processing nodes of the storage system. For example, the logical address space can correspond to one or more volumes, or more generally, one or more storage objects. The storage objects can include logical devices or volumes, files, file systems, directories, and/or sub-portions of such storage objects.

In at least one embodiment, a node assigned a particular logical address, or a subrange of logical addresses, can be designated as the sole owner, respectively, of the logical address or subrange. In at least one embodiment, a node which owns the logical address can perform address resolution processing (sometimes referred to herein as simply resolution processing) for the logical address using the mapping information of MD pages and can traverse the chain of MD pages to obtain content or data stored at the logical address.

In at least one embodiment, the logical address space can be partitioned or divided into slices where each slice corresponds to a sub-volume logical address portion. In this manner, a volume or logical device, or more generally a storage object, can have an associated logical address space which is partitioned into multiple slices. Each such slice can be assigned to a single one of the nodes as the slice's owner.

In connection with discussion herein, a node receiving an I/O operation, such as a read I/O, can sometimes be referred to as the initiator node with respect to the particular I/O operation received at the initiator node.

In at least one embodiment, when a read I/O directed to a logical address LA is received by a non-owner node that does not own LA, the non-owner initiator node can issue a request such as a remote procedure call (RPC) to the owner node to perform processing including resolution processing using mapping information of MD pages associated with the LA. The owner node can then perform resolution processing for LA using the mapping information to obtain a reference, address or pointer that can be used to access the content C1 stored at LA. In at least one embodiment, the reference, address or pointer used to access C1 can be a physical storage location or address on BE non-volatile storage where C1 is stored. The owner node of LA can return a response or reply to the non-owner initiator node, where the response or reply can include the address or reference used to access the desired content C1. The non-owner initiator node can then use the returned address or reference to access C1 from a physical storage location on BE non-volatile storage. The initiator node can then return C1 to the client that issued the read I/O. The RPC request and associated RPC response or reply can be sent over the internode connection between the nodes. The internode connection can be, for example, as described in connection with element 120 of FIG. 2A.

In at least one embodiment, the mapping information can include a multi-level tree or hierarchical structure of MD pages. In at least one embodiment, the number of levels in the tree or structure can be three or more. In at least one embodiment, the tree can be a B+ tree data structure where each non-leaf node can include up to N children. Thus, N can be a specified maximum allowable number of child nodes and N can be 2 or more.

In at least one embodiment in which the mapping information includes a 3 level tree of MD pages, each slice, which is owned by one of the nodes, can correspond to a logical address space subrange associated with a MD leaf page of the tree. The tree can also include a mid MD page level of mid MD pages and a top MD page level of top MD pages. Each mid MD page can include addresses of, or pointers to, MD leaf pages. Each top MD page can include addresses of, or pointers to, MD mid pages.

In at least one embodiment, the storage system can include two nodes and a logical address space can be partitioned into two sets of slices, where each slice set is owned by only a single one of the nodes. The logical address space can be partitioned into consecutive slices which correspond to consecutive, contiguous sequential logical address subranges of the logical address space. The slices can be assigned a unique integer identifier or ID such as beginning with one (1), where even slices can be included a first slice set owned by node A, and where odd slices can be included in a second slice set owned by node B. Each slice can correspond to a logical address subrange size such as 2 MBs. In at least one embodiment, each MD page of the tree of mapping information can include 512 entries, where each entry is a pointer or address. Each non-leaf MD page entry can be a pointer to, or address of, another MD page. Each leaf MD page entry can include a pointer to, or address of, an entry in a VLB (virtual layer block) page. In such an embodiment where each MD leaf corresponds to a 2 MB logical address space portion, each MD leaf entry can correspond to a 4K page of content or stored user data. Each MD leaf entry can include the address of a VLB entry, where the VLB entry further includes another pointer to or address of non-volatile storage containing the content or user data.

In at least one embodiment resolution processing or address resolution processing for LA can use mapping information that includes a VLB page where a MD leaf page entry of the mapping information references a VLB entry of the VLB page, and the VLB entry can further reference a physical location on BE non-volatile storage. In at least one embodiment, the MD leaf page entry of the mapping information for LA can include the address of the VLB entry which further includes an address of a physical location on BE non-volatile storage of C1.

In further detail in at least one embodiment, address resolution processing performed by a node that owns the logical address LA can include traversing the chain of MD pages of mapping information which maps LA to a corresponding physical address PA1 including C1 stored at LA. In particular in at least one embodiment, the resolution processing performed by the node traverses the chain of MD pages (e.g., MD top, MD mid, and MD leaf pages) until an entry E11 of a MD leaf is reached where E11 includes a VLB address, V1, which points to, or is an address of, an entry E12 of a target VLB, VLB1. In at least one embodiment, the VLB address V1 (e.g., address of VLB entry E12) can be characterized as an indirect address, pointer or IDP determined by the node as part of address resolution processing for LA. The VLB entry E12 can then include a PLB (physical large block) address, PA1, where C1 is stored at PA1. In such an embodiment, resolution processing for LA can include reading the VLB entry E12, where E12 includes the PLB address PA1 (whereby reading E12 includes reading PA1). PA1 can be then be used to read or access C1 stored at the address PA1 on BE non-volatile storage.

In at least one embodiment in connection with a read I/O operation requesting to read content for logical address LA where the read I/O is received, from a host, by a non-owner node that does not own LA, the corresponding read I/O workflow can include performing the following sequence of operations: i) the non-owner node receives the read I/O to read the content of LA; ii) the non-owner node can send an RPC to the owner node of LA as noted above; iii) in response the owner node can traverse a corresponding chain of MD pages of mapping information to map LA to PA1, the physical address or location of the content C1 stored at LA; iv) the owner node can return, to the non-owner node, PA1, the pointer or address PA1 that identifies a physical address or location of the content C1 stored at LA; v) the non-owner node can then retrieve C1 using PA1; and vi) the non-owner node can return C1 to the host. In at least one embodiment, the pointer or address, PA1, returned to the non-owner node can be a PLB pointer or address, where the PLB pointer or address identifies a physical address or location in a PLB of BE non-volatile storage.

One problem that can occur in connection with the above-noted read I/O operation workflow is that the PLB pointer or address, PA1, returned by the owner node to the non-owner initiator node may not be protected by any lock within the time interval or window between the steps iv) and v). Thus the foregoing time interval or window can denote a vulnerability window within which the physical storage location having the physical address PA1 can be updated or invalidated by another process or thread performing another workflow thereby resulting in the non-owner node reading incorrect or invalid data (e.g., data corruption) in the step v) of the above-noted read I/O workflow.

A straightforward solution to prevent the storage location with the address PA1 from being overwritten can be to use a lock such that the storage location having address PA1 is locked until the non-owner initiator node reads the content C1 stored at PA1 and acknowledges to the owner that the pointer or address PA1 is no longer in use. However, implementation of the foregoing solution requires extra exchanges and interactions between the nodes and can significantly and undesirably increase the time of lock holding. Additionally, such an approach using the foregoing straightforward solution can have additional drawbacks such as adversely impacting overall system performance and/or increasing the complexity of corresponding workflows.

Accordingly, described in the following paragraphs are techniques that can be performed to overcome at least the above-noted drawbacks. In at least one embodiment, the techniques of the present disclosure provide for read I/O consistency in an efficient manner without incurring the additional per-I/O computational costs, adverse performance impacts and increase in workflow complexity of the above-noted solution using locks.

In at least one embodiment, the storage system can utilize a log-structured architecture or system (LSS). The storage, such as the BE non-volatile storage, where the data or contents of corresponding logical addresses is stored can be in accordance with an LSS. Generally, an LSS can be characterized by allowing new writes to be directed to free or unused storage on a data storage device, and by performing garbage collection (GC) that allows holes of storage including unused or invalid data to be compacted and reused. In an LSS, as newly written data provides updated values for existing data stored at a logical address, the newly written data can be stored at a new physical address or location on BE non-volatile storage rather than overwriting or performing an "in place" update of a first storage location on BE non-volatile storage, where the first storage location contains the existing data of the logical address. After writing the new data to the logical address, where the new data is stored at the new physical address or location, the existing data stored at the first storage location can be old, stale or invalid. The LSS can perform GC processing to reclaim the first storage location containing the stale, invalid data. As a result of performing GC processing, the first storage location can reclaimed, freed and made available for reuse such as, for example, for storing other content or data written to another logical address.

Modern data storage systems can implement an LSS. The LSS as implemented by a data storage system can have its own components, for example, to maintain a log, to perform logical to physical address translation using its own metadata (e.g., such as the chain of MD pages of the mapping information noted above), to perform GC processing, to perform storage management controlling data placement, to perform metadata management, and the like. Additionally in at least one embodiment, a data storage system can also utilize non-volatile BE storage which includes one or more non-volatile solid state storage devices or SSDs. In an LSS in at least one embodiment, newly written content to a logical address can be written to a new physical storage location on the BE SSDs. As noted above, the new content replaces the existing content of the logical address, where the existing content can be stored at another BE SSD storage location that is different from the new physical storage location of the newly written content of the logical address.

Processing can include the LSS of the storage system storing newly written content to a logical address at a new physical address or location each time there is an update or write to the logical address. As needed or desired, GC processing can then be performed to reclaim storage of stale invalid content, where the reclaimed storage can be freed and available for reuse. The GC processing performed by the storage system can include data movement or copying of valid content between BE storage chunks or portions in efforts to create or generate free BE storage chunks or portions for re-use. Although data stored at logical addresses can be written at a first point in time to sequentially contiguously located BE storage locations, as existing data of logical addresses is replaced with newly written content, existing data can become stale and invalid and can create holes of invalid data portions interspersed among valid data portions. As a result, GC processing can be performed to consolidate such valid data portions from multiple storage chunks also including invalid data portions to result in obtaining one or more free storage chunks. For example, GC processing can use two source chunks partially populated with valid content and a single target chunk that is completely free (e.g., storage of entire chunk is free and unused). GC processing can combine the valid content from the two source chunks and store the collective valid content of the two source chunks in the single target chunk, thereby generating one net free chunk. Thus, such GC processing can include writing, copying or moving the valid content of the source chunks to the corresponding single target chunk to consolidate valid content and free storage of the entire two source chunks for reuse. As another example, GC processing can be performed with respect to a single chunk of storage that is partially populated with valid content interspersed between holes of invalid content. GC processing can include consolidating or compacting the valid content such that the valid content is collectively stored at consecutive locations beginning at one end of the single chunk. In this manner, the remaining storage of the single chunk can denote a contiguous portion of storage of the single chunk that can be reused for storing new content.

In at least one embodiment of a storage system implementing an LSS, PLB overwrite or invalidation of a storage location pointed to by PA1, such as between the time window of steps iv) and v) of the read I/O workflow noted above, can occur as a result of GC processing. For example, if PA1 denotes an address in a source chunk noted above, where the source chunk is reclaimed and reused, the storage location having address PA1 in the source chunk can then be overwritten with new data corresponding to a different logical address such that PA1 no longer points to the expected correct valid content or data corresponding to the logical address LA. As another example, PA1 can be an address in the target chunk, where storage of PA1 has been reclaimed and is then overwritten during GC processing. More generally in at least one embodiment during the time window or interval or vulnerability window of the read I/O workflow noted above, GC processing can result in reclaiming the storage of PA1 where PA1 is then overwritten with new content that overwrites existing valid content C1 of a corresponding logical address LA.

In at least one embodiment, the techniques of the present disclosure maintain and utilize a set of hints that can be used to verify data or content read using a corresponding PLB pointer or address, such as PA1, in connection with the read I/O workflow. In at least one embodiment, such hints can be used in connection with data verification and recognizing when data or content read, using a PLB pointer or address returned in connection with an RPC reply or response, was overwritten such as a result of GC processing or other data. As a result of using the hints and recognizing that the data or content of the logical address LA as read using the PLB pointer has been overwritten, data verification or validation can fail. In at least one embodiment in response to the non-owner initiator node determining data verification or validation failure (e.g., data invalidation determined) with respect to the content or data of LA read using the PLB pointer returned in the RPC response, the non-owner initiator can issue another RPC request to the owner node for the same logical address LA thereby resulting in repeating steps ii), iii) and iv) of the above-noted read I/O workflow and returning a new PLB pointer. Additionally in at least one embodiment, the non-owner initiator node can then repeat step v) of the read I/O workflow to read new content using the newly returned PLB pointer. The non-owner initiator node can then repeat performing processing for data verification or validation of the new content using the hints. In at least one embodiment, repeating the foregoing steps ii), iii) and iv) is expected to result in obtaining the new PLB pointer that is now valid and points to the correct expected valid content C1 of the corresponding logical address LA.

In at least one embodiment where the content C1 is stored at the logical address LA, if GC processing moves or relocates the content C1 from the physical address or location PA1 to another second physical address or location PA2, additional processing can also be performed to update all references to the content C1 to now reference PA2. In at least one embodiment PA2 can be another PLB address in BE non-volatile storage. In at least one embodiment as a result of GC processing, one of the references updated can include a corresponding MD page entry, such as a VLB page entry that is updated to include PA2 rather than PA1. So in at least one scenario, a first RPC request can result in the owner node of LA performing address resolution processing at a first point in time using a VLB page that includes PA1.

At the first point in time, the content C1 may have been moved from PA1 to PA2, and also PA1 may have been overwritten or reused for storing new content NEW corresponding to another different logical address other than LA. At the first point in time, the VLB page may also not yet be updated from PA1 to PA2 such that the VLB page still includes PA1. As a result at the first point in time, the owner node returns PA1 to the non-owner initiator node in response to the first RPC. The initiator node then uses PA1 to read content for the logical address LA. However, the invalid content NEW is stored at PA1 and is detected as invalid content for LA as a result of a data validation failure using the hints in accordance with the techniques of the present disclosure. Repeating the processing using a subsequent second RPC request can include the initiator node issuing the second RPC request to the owner node of LA where the owner node repeats address resolution processing for LA at a second point in time using the updated VLB page that includes PA2 rather than PA1. Thus in at least one embodiment, between the first and second points in time, the VLB page can be updated to now include the new physical location or address PA2 where C1 is stored. As a result at the second point in time, the owner node returns PA2 to the non-owner initiator node in response to the second RPC. The initiator node then uses PA2 to read the expected valid content C1 as detected by the successful data validation using the hints.

Thus in at least one embodiment, the techniques of the present disclosure can be used to provide data consistency in a dual node active-active storage system that implements an LSS where both nodes can receive and service I/Os.

The foregoing and other aspects of the techniques of the present disclosure are described in more detail in the following paragraphs.

Figure 7:
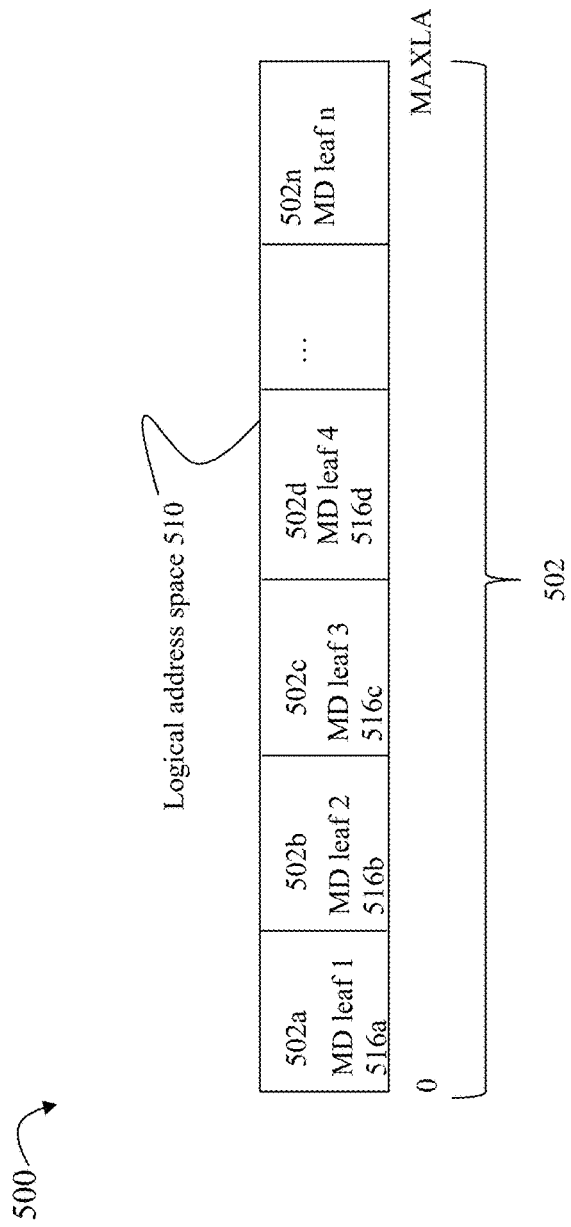
FIG. 7 is an example illustrating a partitioned logical address space in at least one embodiment in accordance with the techniques of the present disclosure.

Referring to FIG. 7, shown is an example 500 illustrating a partitioned logical address space into slices in at least one embodiment in accordance with the techniques of the present disclosure.

The example 500 includes the logical address space 510. The logical address space 510 can denote a contiguous logical address range such as of one or more volumes or LUNs.

In at least one embodiment in accordance with the techniques of the present disclosure, the user data (UD) logical address space 510 can be partitioned into multiple slices or portions 502, such as denoted by multiple logical address slices or portions 502a-n. Each of the logical address slices or portions 502a-n can be a same size, such as 2 MB (megabytes), or any other suitable size. In at least one embodiment, each logical address space portion or slice 502a-n can be 2 MB to correspond to the logical address subrange of each single MD leaf of the MD leaf layer 516. The multiple address space slices or portions 502a-n can then be divided among the two nodes such that a first of the nodes, such as node A, is assigned ownership of a first slice set of the logical address slices or portions 502; and a second of the nodes, such as node B, is assigned ownership of a second slice set of logical address slices or portions 502.

The logical address space 510 can denote an associated logical address space of any one or more storage objects or storage space. The one or more storage objects can include, for example, one or more volumes, logical devices or LUNs; one or more sub-volume or sub-LUN portions; one or more file systems; one or more files; one or more sub-file system portions (e.g., each file system portion being less than an entire file system); and/or one or more vvols or virtual volumes used by one or more virtual machines. Generally, the logical address space 510 can denote a contiguous range of consecutive logical addresses so that each of the logical address slices or portions 502a-n is mapped to a unique subrange of consecutive contiguous logical addresses of the logical address space 510. For example, consider an embodiment where each of the slices or logical address portions 502a-n is 2 MB in size. In this case, the slice 502a can include all logical addresses x in the subrange $0 \leq x < 2$ MB (e.g., (0-2 MB]); the portion 502b can include all logical addresses x in the subrange $2 \text{ MB} \leq x < 4 \text{ MB}$ (e.g., (2 MB-4 MB]); and so on.

The logical address slices or portions 502 can be partitioned into the two slice sets where each slice or logical address portion 502-n is included in only one of the two slice sets. In at least one embodiment, the logical address slices 502 can be partitioned equally as possible between the two nodes A and B although other unequal partitionings can also be suitable for use with the techniques of the present disclosure.

In at least one embodiment, the logical address slices of the contiguous logical address space 510 can alternate in connection with ownership assignment among the nodes A and B. In this manner, ownership of slices or portions of the logical address space 510 can be interleaved among the nodes A and B. For example with reference to FIG. 7 the slices 502a-n can correspond to consecutive contiguous logical address subranges of the logical address space 510, where 0 can denote the starting or lowest logical address of 510 and MAXLA can denote the ending or highest logical address of 510. Assuming each of the slices 502a-n is 2 MB and thus corresponds to a different MD leaf, the first 2 MB subrange (e.g., logical addresses (0 through 2 MB]) of 510 can correspond to the slice 502a; the second 2 MB subrange (e.g., logical addresses (2 MB through 4 MB]) of 510 can correspond to the slice 502b; the third 2 MB subrange (e.g., logical addresses (4 MB through 6 MB]) of 510 can correspond to the third slice 502c; the fourth 2 MB subrange (e.g., logical addresses (6 MB through 8 MB]) of 510 can correspond to the fourth slice 502d, and so on, for each slice in 510.

In at least one embodiment, each slice 502a-n can be assigned a corresponding unique slice identifier or ID which is an integer ID in a consecutive integer sequence corresponding to a relative position in a consecutive and contiguous ordering of the logical address subranges of the slices. For example, the slice 502a has an ID of "1", the slice 502b has an ID of "2", the slice 502c has an ID of "3", and so on, as the associated logical address subranges of the slices increase. In at least one embodiment, ownership of a slice of the logical address space 510 can be derived from or based on the relative consecutive ordering or placement of the slice itself. For example, as noted above, the owner of a logical address slice can be based on whether the slice has an associated even or odd slice ID. In at least one embodiment, all odd slices with odd slice IDs (e.g., slices 516a, 516c, and so on) can be included in a first slice set owned by node A, and all even slices with even slice IDs (e.g., slices 516b, 516d, and so on) can be included in a second slice set owned by node B.

Thus, each logical address of the logical address space or range 510 can be owned by a single one of the nodes A or B.

In at least one embodiment, an architecture can be utilized which partitions ownership of a logical address space of user data or content among the multiple processing nodes of the storage system. For example, the logical address space can correspond to one or more volumes, or more generally, one or more storage objects. The storage objects can include logical devices or volumes, files, file systems, directories, and/or sub-portions of such storage objects.

In at least one embodiment, a node assigned a particular logical address, or a subrange of logical addresses, can be designated as the sole owner, respectively, of the logical address or subrange. In at least one embodiment, a node which owns the logical address can perform address resolution processing (sometimes referred to herein as simply resolution processing) for the logical address using the mapping information of MD pages and can traverse the chain of MD pages to obtain a pointer to or address of the requested read data as stored on BE non-volatile storage.

In at least one embodiment, the logical address space can be partitioned or divided into slices where each slice corresponds to a sub-volume logical address portion. In this manner, a volume or logical device, or more generally a storage object, can have an associated logical address space which is partitioned into multiple slices. Each such slice can be assigned to a single one of the nodes as the slice's owner.

Consistent with other discussion herein in at least one embodiment, consider a read I/O that is directed to a logical address LA and that is received by an initiator node that does not own LA. In at least one embodiment, the read I/O can be received by the initiator node of a dual node storage system where both nodes of the system can service I/Os and where the remaining peer node, rather than the initiator node, owns LA. In at least one embodiment, the storage system can implement an LSS such that GC processing is performed with respect to PLBs of BE non-volatile storage used for storing user data or content, as well as possibly other data or content. In such an embodiment, read I/O workflow processing can be performed as discussed elsewhere herein with additional modifications described below in accordance with the techniques of the present disclosure. In at least one embodiment, the techniques of the present disclosure can be used to provide data consistency in connection with content or data stored at logical addresses.

In at least one embodiment, a time interval or window can exist between the steps iv) and v) of the above-noted read I/O workflow where there is no lock or other mechanism used to prevent modification of a storage location pointed to by a PLB pointer PA1 returned in response to an RPC request. Thus, the foregoing time interval or window can denote the vulnerability window within which the physical storage location pointed to by PA1 can be updated or invalidated by another process or thread thereby resulting in the non-owner node reading incorrect or invalid data (e.g., data corruption) in the step v) of the above-noted read I/O workflow. In at least one embodiment, GC processing can be performed that reclaims for reuse the physical storage corresponding to PA1 such that the physical storage location having the address PA1 is overwritten with new content, NEW, during the vulnerability window of the read I/O workflow. Assume for illustration purposes that PA1 is the address of the valid current content C1 stored at a logical address LA where C1 is overwritten with NEW during the vulnerability window of steps iv) and v) of the above-noted read I/O workflow. In this case, the techniques of the present disclosure can be used to detect and recognize the foregoing data invalidation or data inconsistency that can result due to an overwrite of the storage location of PA1 during the vulnerability window. The techniques of the present disclosure can be used to detect and recognize the foregoing data invalidation or inconsistency as a result of the overwrite with respect to content stored at PA1 for the corresponding logical address LA, where PA1 is the address of the content NEW and where NEW is invalid content with respect to LA (e.g., NEW is not the valid content of the logical address LA).

In at least one embodiment with respect to the logical address LA, the techniques of the present disclosure can be utilized to perform data validation or verification processing in connection with validating or verifying content referenced by a PLB pointer or address, such as PA1, that is returned to a non-owner initiator node by an owner node in response to an RPC request, where PA1 is expected to reference or point to the current valid content of LA. Such data validation or verification processing performed in accordance with the techniques of the present disclosure can be used to detect or recognize a data invalidation or inconsistency when the storage location corresponding to PA1 has been overwritten such that PA1 does not reference the valid content of LA.

In at least one embodiment, the techniques of the present disclosure provide data consistency during the above-noted vulnerability window of the read I/O workflow using a lockless solution. In at least one embodiment during the vulnerability window, the PLB storage or page P1 located at the PLB address PA1 is not locked such that C1, as stored in P1 at PA1, can be overwritten with other content thereby invalidating P1 and PA1 with respect to LA such that PA1 does not reference current valid content of LA. As such the techniques of the present disclosure can be used to detect when such overwriting has occurred in order to avoid returning incorrect or invalid content for LA.

In at least one embodiment, the techniques of the present disclosure can include maintaining a set of hints used in data verification or validation processing that can detect when data read using a corresponding PLB pointer or address such as PA1 was overwritten. In at least one embodiment, the hints can be stored in a corresponding VLB page and VLB entry associated with PA1 and also associated with a corresponding LA. In at least one embodiment, the VLB entry can be included in mapping information of the chain of MD pages traversed in connection with mapping LA to corresponding content stored at LA. In at least one embodiment of a read I/O workflow, when the owner node of LA replies to an RPC request from an initiator node that does not own LA, the owner node can return information including the PLB pointer or address, PA1, along with the hints. In response to receiving the reply to the RPC request, the initiator node can read the content stored at PA1, and then perform data verification or validation processing using the hints to validate or verify that the content read from PA1 is valid with respect to the corresponding logical address LA. In case of a data validation or verification failure, the initiator node can then reissue the RPC request for the same LA. In response, the owner node can repeat address resolution processing for LA to obtain a new PLB pointer or address, such as PA2, that is expected to correctly identify the physical storage location or address of valid content of LA. The owner node can issue a second RPC reply or response including PA2 and corresponding hints. The initiator node can retrieve content stored at PA2 (as returned in the second RPC reply) and can perform data validation processing on the retrieved content. In at least one embodiment, the retrieved content using PA2 can correspond to C1, the valid current content of LA, and the associated data validation processing can be expected to be successful.

In at least one embodiment, the hints (sometimes referred to as verification or validation hints) can include: a hash value of content stored at a corresponding physical address or location; and a generation identifier or GenID of a PLB where corresponding content is stored. Each PLB, or more generally unit of BE non-volatile storage, can have a corresponding GenID. In at least one embodiment, the GenID for a PLB can be implemented as a bit field. More generally, the GenID can be a field with any suitable number of one or more bits. In at least one embodiment, the size or number of bits of the GenID field can be based, at least in part, on the maximum number of times a PLB (and thus the PLB's pages or storage locations) can be overwritten or reused within the vulnerability window or time interval of the read I/O workflow. More generally, the GenID field for a PLB can be any suitable number of bits having a value that denotes a particular version, generation or set of content written to the PLB. Each time the PLB is freed and reclaimed by GC processing for reuse such that a new set of data pages or content can be written to the PLB, the GenID of the PLB is incremented by 1 and the newly incremented GenID value is also the GenID of each data page or content stored in the PLB at that point in time.

Thus in at least one embodiment where a PLB storage location can be overwritten at most one time during the vulnerability window of the read I/O workflow, the GenID filed of each PLB can be 1 bit in size and can thus have a value of 0 or 1. In such an embodiment where the GenID field is 1 bit, and sometimes referred to as a Genbit field, each time a PLB is reused or rewritten, the GenID or Genbit field can be flipped or inversed. (e.g., If Genbit=0 of a PLB, then the PLB's Genbit becomes 1 when the PLB is next rewritten. If Genbit=1 of a PLB, then the PLB's Genbit becomes 0 when next rewritten.) More generally, the GenID field can be an integer value that is incremented by 1 each time a PLB is reused or rewritten. In at least one embodiment, the GenID field values can "wrap around" and restart over at 0 once the largest value that can be represented in the Gen ID field is reached. For example, if GenID is 2 bits in size, the GenID field can be 0, 1, 2 or 3. Once the 2 bit GenID field is 3 for a particular PLB, the next time the PLB is rewritten or reused, its GenID field can be 0. In at least one embodiment where a PLB can be overwritten a maximum number of times=3, the GenID field can be 2 bits in size.

In at least one embodiment with a single bit GenID for each PLB, it means that the PLB can be overwritten or reused at most once within the vulnerability window.

The GenID field can be an attribute of a corresponding PLB. A first PLB such as a source PLB can be cleaned, reclaimed, or freed by GC processing such that all valid content of the first PLB is moved or removed from the first PLB to another second PLB. Each time the first PLB is cleaned, reclaimed or freed by GC processing, the first PLB is entirely free for reuse in storing new content and its corresponding GenID field can be incremented by 1. A single PLB can include multiple pages of content or UD (e.g., multiple UD pages). In at least one embodiment, each UD page stored in the single PLB can inherit the GenID of the single PLB in which the UD page is included or contained. In at least one embodiment as an optimization for efficiency to avoid extra reads, the GenID of the PLB can be stored with each UD page of the PLB. In particular in at least one embodiment, each UD page of the PLB can have an associated UD page header that includes the GenID of the PLB, along with possibly other information that can vary with embodiment. Put another way, the GenID of the PLB can be stored per UD page as an optimization in at least one embodiment.

Figure 8:
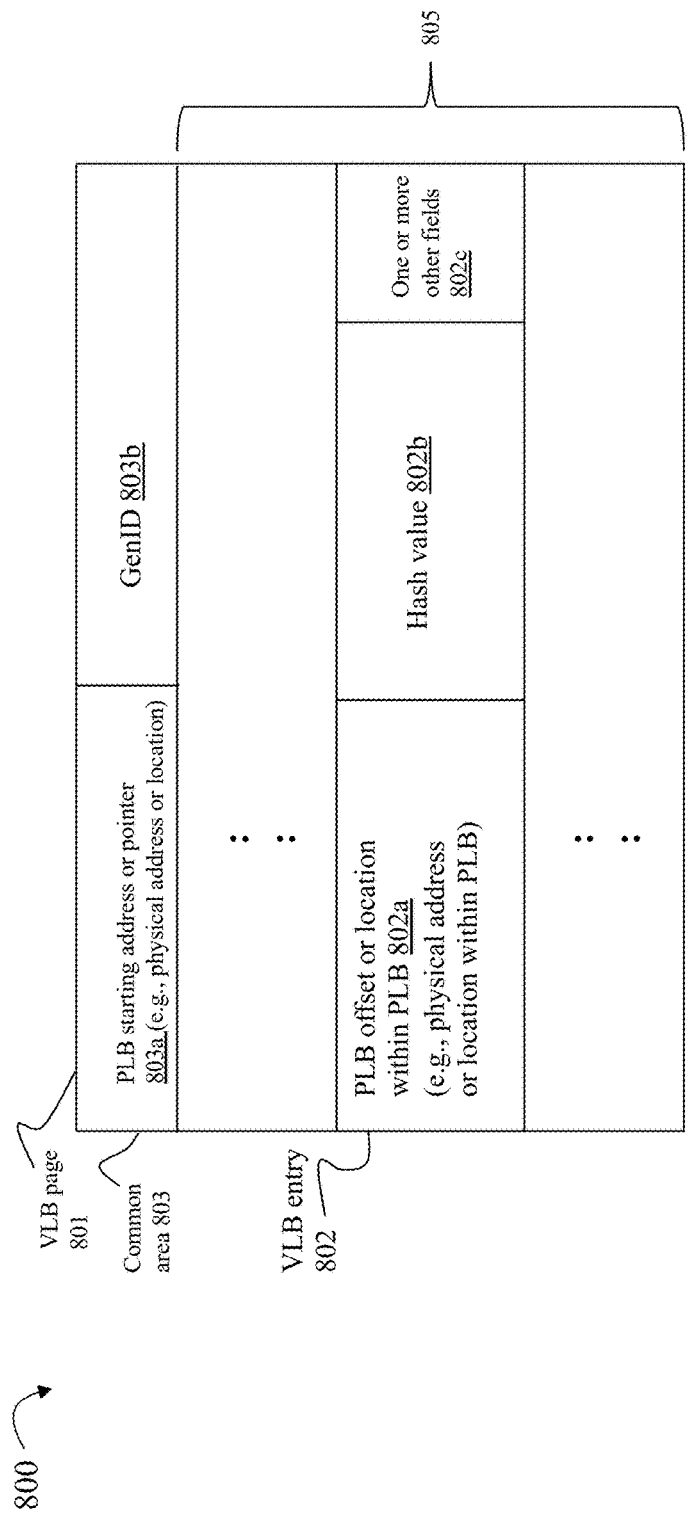
FIGS. 8, 9 and 12 are examples illustrating various structures that can be used in at least one embodiment in accordance with the techniques of the present disclosure.

Referring to FIG. 8, shown is an example 800 of information that can be included in a VLB page 801 and each VLB entry 802 of the VLB page 801 in at least one embodiment in accordance with the techniques of the present disclosure. The VLB page 802 and corresponding VLB entry 802 of FIG. 8 can be used, for example, in at least one embodiment where each UD page of a PLB has a corresponding page header such as noted above and also illustrated in FIG. 9 discussed below.

Each VLB page 801 can include a common area 803 and multiple VLB entries 805. In at least one embodiment, the common area 803 can be used to store information that is common among the multiple VLB entries 805, to optimize usage of storage and/or memory with respect to the VLB page 801. The VLB entry 802 illustrates in further detail information that can be included in each of the VLB entries 805 although only a single instance of a single VLB entry 802 is shown for simplicity. The VLB entry 802 can be, for example, any of the VLB entries 1357*a*, 1357*b* of FIG. 6. Consistent with other discussion herein, each of the VLB entries 805 can be associated with a corresponding UD page of a corresponding PLB where the corresponding UD page can store content or UD in the corresponding PLB. In at least one embodiment, content of multiple UD pages associated respectively with the multiple VLB entries 805 of the VLB page 801 can be stored in the same single PLB of BE non-volatile storage. Thus in at least one such embodiment, the physical address or location of content associated with each single VLB entry can be expressed using a starting or base address or pointer to the PLB and a corresponding offset or location within the PLB where the content is stored. For example, the physical address or location of content C1 stored in the PLB can be expressed using a PLB base address or starting address BASE, and a corresponding location or offset OFF1 within the PLB, where the physical address of C1 can be determined using BASE and OFF1, such as by adding BASE and OFF1. In at least one such embodiment, BASE denoting the starting address of, or pointer to the first physical address or location of the PLB can be common to all VLB entries 805 and can be stored in the field 803*a* of the common area 803. Each entry, such as the VLB entry 802, can be associated with particular content such as C1 stored at a particular offset or location within the PLB, where the corresponding PLB offset or location within the PLB can specific and vary with each corresponding VLB entry 802. In at least one such embodiment, the PLB offset or location OFF1 that varies with each VLB entry 802 can be stored in field 802*a* of the corresponding VLB entry 802. To further illustrate with respect to content C1 where the VLB entry 802 is associated with content C1 stored in a UD page of a PLB having a starting address or location BASE and where C1 is stored at offset or location LOC1 within the PLB, the common area field 803*a* can include that value of BASE and C1's corresponding VLB entry 802 can include the value of LOC1 in the field 802*a* of the VLB entry 802.

In at least one embodiment, since all VLB entries 805 are associated with corresponding UD pages and content of the same corresponding single PLB, all such VLB entries 805 have a same corresponding GenID of the single PLB. In at least one such embodiment, the current value of the corresponding PLB's GenID can be stored in the GenID field 803*b* of the common area 803.

Thus use of the common area 803 can provide for reduced consumption of volatile storage and non-volatile storage in connection with storing the VLB page 801. However, the techniques of the present disclosure are not limited to such an embodiment as illustrated in FIG. 8 and the information of the common area 803 can be obtained and/or stored in other arrangements or layouts. For example in at least one alternative embodiment not using a common area 803 for a VLB page 801, each VLB entry 802 can alternatively include, in its field 802a, the complete physical address, pointer or location or PLB address of where corresponding content C1 is stored such that the field 802a can include the physical address or location of C1 in accordance with BASE and LOC1. For example in at least one alternative embodiment not using a common area 803 for a VLB page 801, each VLB entry 802 can alternatively include in the field 802a the complete physical address, pointer or location on BE non-volatile storage of where corresponding content C1 is stored such that the field 802a can include the physical address or location of C1 in accordance with BASE and LOC1. As another example in at least one alternative embodiment not using a common area 803 for a VLB page 801, each VLB entry 802 can alternatively include a field storing the current value of the GenID of the PLB where content C1 is stored and where the physical address or location of C1 is identified using field 802a of the VLB entry 802.

In the example 800 of FIG. 8, the VLB entry 802 can include the particular fields 802a-b of FIG. 8 as well as one or more other fields 802c some of which are discussed elsewhere herein (e.g., a reference count such as in FIG. 6). In at least one embodiment, the VLB entry 802 can include the following fields: a PLB offset or location 802a, and a hash value 802b. Generally, the information of 800 can be included along with any other desired information in each VLB entry. To further illustrate reference is made back to the VLB entry 1357a of FIG. 6. The VLB entry 1357a can be included in the mapping information of the chain of MD pages used to map the logical address LA to its corresponding content or UD, such as C1, as stored in the data block or UD page 1362. Element 1362 can denote a UD page in a PLB of BE non-volatile storage. The element 1359a of FIG. 6 can denote the physical address PA1 of the UD or content, such as C1, stored in the data page 1362. With reference back to FIG. 8, PA1 can be determined using the BASE address or pointer (as stored in 803a) of the PLB and an associated location or offset OFF stored in 802a of the VLB entry. In at least one embodiment, the offset or location OFF 802a can denote an offset or location added to the BASE address or pointer 803a of the PLB. The GenID 803b can be the value of a GenID of the PLB including the UD page 1362. The hash value 802b can be a hash value of the content C1 stored in the page 1362 of the PLB.

In at least one embodiment, the hash value 802b can be determined using a hash function or algorithm based, at least in part, on the corresponding stored content C1 of the UD page 1362. The hash value, HV1, for the corresponding content C1 can be computed using a hash function or hash algorithm, F, and represented as F(C1)=HV1. Generally, any suitable hash function can be used as F. In at least one embodiment, F can be a non-cryptographic hash. In at least one embodiment, hash collisions can occur for hash values computed using F where two different non-identical data items, values or contents both have the same hash value as computed using F. Thus in at least one embodiment, the hash value for the stored content can be used as one of the hints for data validation or verification using the techniques of the present disclosure. However in at least one embodiment such as where F is a non-cryptographic hash function, the hash value alone can be insufficient to detect when the corresponding content, such as C1 stored in a PLB, has been modified or overwritten. The hash value 802b can be computed for the corresponding content C1 when C1 is stored in the UD page 1362 of the PLB. Thus each time the UD page 1362 is overwritten with new content, a new corresponding hash value can be computed using F and stored in field 802b of the corresponding VLB entry 802. More generally, the hash function F can be any suitable hash function.

Figure 9:
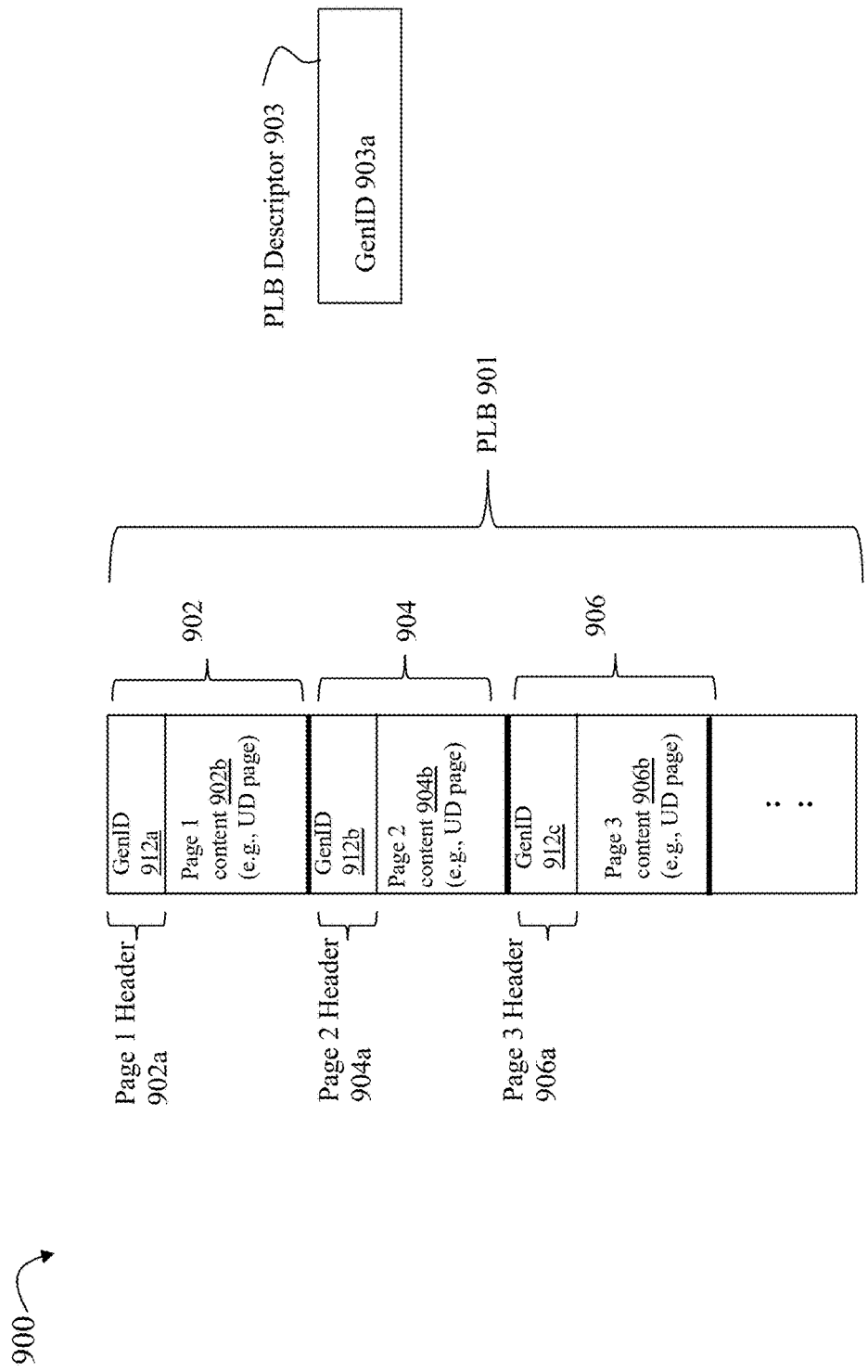

Referring to FIG. 9, shown is an example 900 illustrating a PLB descriptor 903 and a layout of UD pages and associated page headers for a single PLB 901 in at least one embodiment in accordance with the techniques of the present disclosure.

The PLB 901 can have an associated PLB descriptor 903 that can include information about the PLB 901. In at least one embodiment, the PLB descriptor 903 can include a GenID field 903a that includes the current GenID value for the corresponding PLB 901. Initially, the GenID field 903a for the PLB 901 can be 0. Each time the PLB 901 is reclaimed and reused such that a new set of content for the PLB 901 is stored or written to BE non-volatile storage, the GenID 903a associated with the PLB 901 can be incremented by 1. In at least one embodiment, the PLB descriptor 903 of each persisted PLB can also be persistently stored on BE non-volatile storage. With reference back to FIG. 8, the GenID 803b corresponding to a VLB entry 802 always follows or reflects the GenID of the corresponding PLB page and PLB page header.

The example 900 includes a single PLB 901 including information 902, 904, and 906 for multiple corresponding pages 902b, 904, 906b, such as UD pages of content. More generally, BE non-volatile storage can include multiple PLBs having a format and layout similar to the PLB 901 of FIG. 9.

The current value of the GenID 903a of the PLB 901 is also an attribute of each UD page of content stored in the PLB 901 at a particular point in time. For example, at one point in time T1 the GenID 903a of PLB 901 can be 0 when a first set of content is written to pages of the PLB 901, such as the pages 902b, 904b, 906b, and the like. At the one point in time T1, the current GenID 903a=0 can also be stored in corresponding pages headers for the pages of the PLB 901. At another subsequent point in time T2 when a different set of content is written to the pages of the PLB 901, PLB 901's GenID is incremented to 1 and can also be stored in corresponding pages headers for the pages of the PLB 901.

In the example 900, the element 902 denotes a storage area or portion of the PLB 901 that includes page 1 of content 902b (e.g., a UD page) and its corresponding page header 902a. The page header 902a can include information about the particular page of content 902b. In at least one embodiment, the page header 902a can include GenID 912a, where GenID 912a is the current value of the GenID 903a of the PLB 901 at the time when the particular content 902b is stored.

In the example 900, the element 904 denotes a storage area or portion of the PLB 901 that includes page 2 of content 904b (e.g., a UD page) and its corresponding page header 904a. The page header 904a can include information about the particular page of content 904b. In at least one embodiment, the page header 904a can include GenID 912b, where GenID 912b is the current value of the GenID 903a of the PLB 901 at the time when the particular content 904b is stored.

In the example 900, the element 906 denotes a storage area or portion of the PLB 901 that includes page 3 of content 906b (e.g., a UD page) and its corresponding page header 906a. The page header 906a can include information about the particular page of content 906b. In at least one embodiment, the page header 906a can include GenID 912c, where GenID 912c is the current value of the GenID 903a of the PLB 901 at the time when the particular content 906b is stored. In a similar manner in at least one embodiment, the PLB 901 can include additional pages of content and corresponding pages headers. Thus to reflect the fact that all UD pages stored in the PLB 901 at a first point in time T1 correspond to a particular version or generation of content stored in the PLB 901, each of the GenIDs in corresponding page headers of the stored UD pages of the PLB 901 store the current value of GenID 903*a* of the PLB descriptor 903 corresponding to the generation of content of PLB 901 at time T1. At a subsequent second point in time T2 when PLB 901 is reclaimed, freed and reused for storing a new set, version or generation of content of UD pages, the value of GenID 903*a* corresponding to the PLB 901 can be incremented and each of the GenIDs (e.g. 912*a-c*) in corresponding page headers of the stored UD pages of the PLB 901 store the revised incremented value of GenID 903*a* of the PLB descriptor 903 corresponding to the generation of content of PLB 901 at time T2. Consistent with discussion herein in at least one embodiment, the GenID 903*a* can be an attribute of a respective PLB 901 such that the UD pages stored in the PLB 901 at a point in time inherit the GenID 903*a* of the PLB 901 where each of the stored UD pages (e.g., 902*b*, 904*b*, 906*b*) has a corresponding page header (e.g., 902*a*, 904*a*, 906*a*) that includes the current value of the PLB 901's GenID 903*a*. For example, at time T1 noted above, if the PLB 901's GenID 903*a*=0, the same value of 0 is stored in respective page headers of all UD pages stored in the PLB 901 at time T1 (e.g., GenID 912*a*=0, GenID 912*b*=0, GenID 912*c*=0, and so on for all other page headers of UD pages stored in the PLB 901 at time T1). At time T2 noted above, if the PLB 901's GenID 903*a*=1, the same value of 1 is stored in respective page headers of all UD pages stored in the PLB 901 at time T2 (e.g., GenID 912*a*=1, GenID 912*b*=1, GenID 912*c*=1, and so on for all other page headers of UD pages stored in the PLB 901 at time T2).

In at least one embodiment as illustrated in FIG. 9, a page header of a corresponding UD page of a PLB can be stored at locations or addresses adjacent to the UD page such as preceding the UD page. More generally, an embodiment can store page headers and corresponding UD pages in any suitable arrangement.

With reference back to FIG. 8 in at least one embodiment, the GenID field 803*b* corresponding to the VLB entry 802 is set to the GenID value of the corresponding PLB UD page or content. For example, assume the VLB entry 802 includes a PLB offset 802*a* used (e.g., in combination with a PLB base address or pointer) to point to or reference the content or UD page 902*b* having a corresponding page header 902*a*. In this case, the GenID 803*b* corresponding to the VLB entry 802 can be set to the GenID 912*a* of the page header 902*a* at the time the content or UD page 902*b* is stored in the PLB 901.

It should be noted that although discussion herein can illustrate a PLB address or pointer (e.g., BASE +OFFSET) being the address or location of UD page 902*b*, in some embodiments where each UD page such as 902*b* of a PLB includes a corresponding page header, the PLB address or pointer can also identify the physical address or location of the corresponding page header such as 902*a*. In this latter case in at least one embodiment, the corresponding UD page content 902*b* can be accessed based on the address or location in the PLB of the associated page header 902*a*. For example in at least one embodiment, each page header can be a fixed defined size Z such that the UD page 902*b* can be accessed using the pointer or address of the page header 902*a* and the defined size Z.

In at least one embodiment, when each PLB and VLB is initially first written, all GenID fields of all PLB page headers (e.g., 902*a*, 904*a*, 906*a*) and all VLB pages for all VLB entries can be set to 0. Each time a PLB 901 is written or reused to store a new set of content in pages of the PLB 901, the PLB's GenID field 903*a* can be incremented and all pages (e.g., 902*b*, 904*b*, 906*b*) in the PLB 901 can inherit the current incremented value of the PLB's GenID field 903*a*. In at least one embodiment, the current value of the PLB's GenID field 903*a* inherited by pages (e.g., 902*b*, 904*b*, 906*b*) of the PLB 901 can be stored in GenID fields (e.g., 912*a-c*) of corresponding page headers (e.g., 902*a*, 904*a*, 906*a*). Thus the GenID fields 912*a-c* in the respective pages headers 902*a*, 904*a*, 906*a* can be set to reflect the current value of the PLB GenID 903*a*.

In at least one embodiment where an initiator node receives a read I/O to read content from the logical address LA not owned by the initiator node but where LA is owned by the peer node, the initiator node can send an RPC request to the owner node of LA to perform address resolution processing for LA. In response the owner node can perform address resolution processing for LA. The address resolution processing can include traversing a chain of MD page of mapping information used to map LA to its corresponding content C1 as stored on BE non-volatile storage. The owner node of LA can return an RPC reply or response to the initiator node. The RPC reply or response can include hints and a current physical storage location or address such as PA1 denoting a PLB pointer or address of page 1 902*b* of the content C1, where C1 is stored at PA1 and where PA1 can be the physical address of the storage area 902*b*. The hints and physical storage location PA1 can be determined using a corresponding VLB entry 802 and common area 803 of the VLB page 801 including the VLB entry 802. The hints can include the current value CV1 of the GenID 912*a* corresponding to the page 902*b*. The hints can also include a hash value HV1 for the content C1 as stored in 902*b* at PA1 in the PLB 901. In at least one embodiment, the owner node of LA can determine PA1 of the RPC reply using the PLB starting address BASE of 803*a* and the PLB offset or location OFF1 of 802*a* of the VLB entry 802. In at least one embodiment, the owner node of LA can obtain HV1 of the RPC reply by reading HV1 from field 802*b* of the VLB entry 802. In at least one embodiment, the owner node of LA can determine the current value CV1 by reading the GenID 803*b* of the common area 803 of the VLB page 801.

The initiator node can receive the RPC reply including PA1 and the hints. In response to receiving the RPC reply, the initiator node can: retrieve the current contents or page CON1 stored at PA1 902*b*; retrieve the current value CV2 of the GenID 912*a* for the page 902*b*; and calculate a hash value HV2 for the retrieved contents CON1. The initiator node can perform data validation processing using the hints to determine whether the content C1 stored at PA1 (when the owner node sent the RPC reply) was subsequently overwritten with new content such as a result of GC processing within the vulnerability window prior to the initiator node retrieving the contents using PA1 of the RPC reply.

In at least one embodiment, data validation processing performed by the initiator node can include comparing CV1 (the GenID value of the RPC reply) with CV2 (the GenID value associated with PA1 at the time the initiator retrieves CON1 from PA1 of the RPC reply). If CV1=CV2, it means that content C1 of the page 902*b* was not overwritten after the pointer or address PA1 was sent in the RPC reply (e.g., CON1=C1). Otherwise if CV1 does not equal CV2, it means that content C1 of the page 902*b* was overwritten with new content CON1 after the pointer or address PA1 was sent in the RPC reply (e.g., CON1 C1).

In at least one embodiment, data validation processing performed by the initiator node can include comparing HV1 (the hash value of the RPC reply) with HV2 (the hash value calculated for the content CON1 as retrieved by the initiator using PA1 of the RPC reply). If HV1 does not equal HV2, it means that content C1 of the page 902b was overwritten after the pointer or address PA1 was sent in the RPC reply (e.g., CON1 C1). In at least one embodiment due to the possibility of hash collisions, HV1=HV2 may not be sufficient to conclude that CON1=C1. However, if HV1 does not equal HV2, it can be concluded that CON1 C1 such that C1 stored at page 902b having address PA1 was overwritten with new content CON1 after the pointer or address PA1 was sent in the RPC reply. In at least one embodiment, data validation processing performed by the initiator node as described above can be successful and indicate that CON1=C1 (that C1 stored at PA1 902b was not overwritten or invalidated in the vulnerability window if: HV1=HV2; and also CV1=CV2. Otherwise, data validation processing can fail and indicate that CON1 C1 (that C1 stored at PA1 902b was overwritten with content CON1 in the vulnerability window and thus invalidated).

Figure 10A:
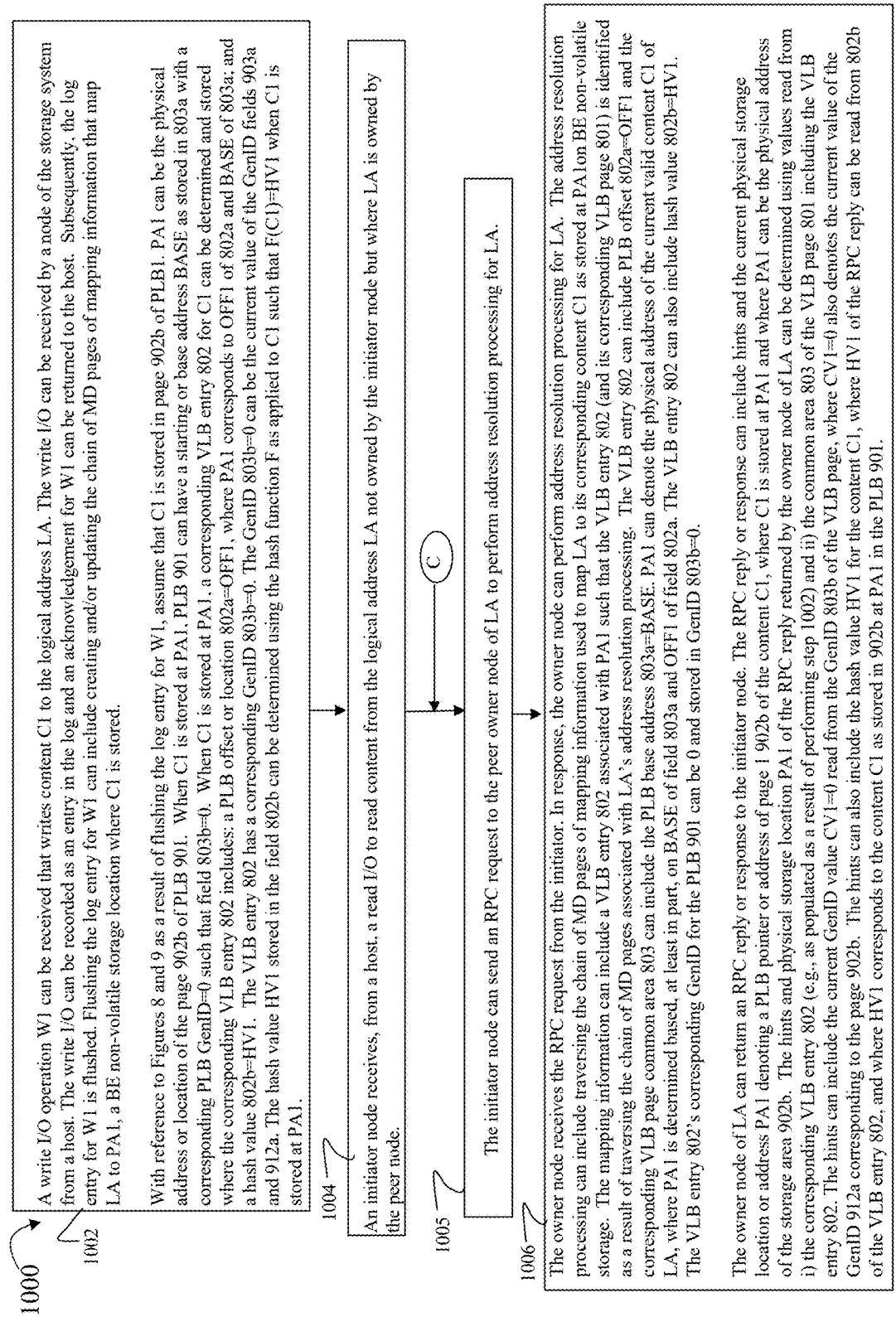
FIGS. 10A, 10B, 10C, 11A, 11B and 11C are flowcharts of processing steps that can be performed in at least one embodiment in accordance with the techniques of the present disclosure.
Figure 10B:
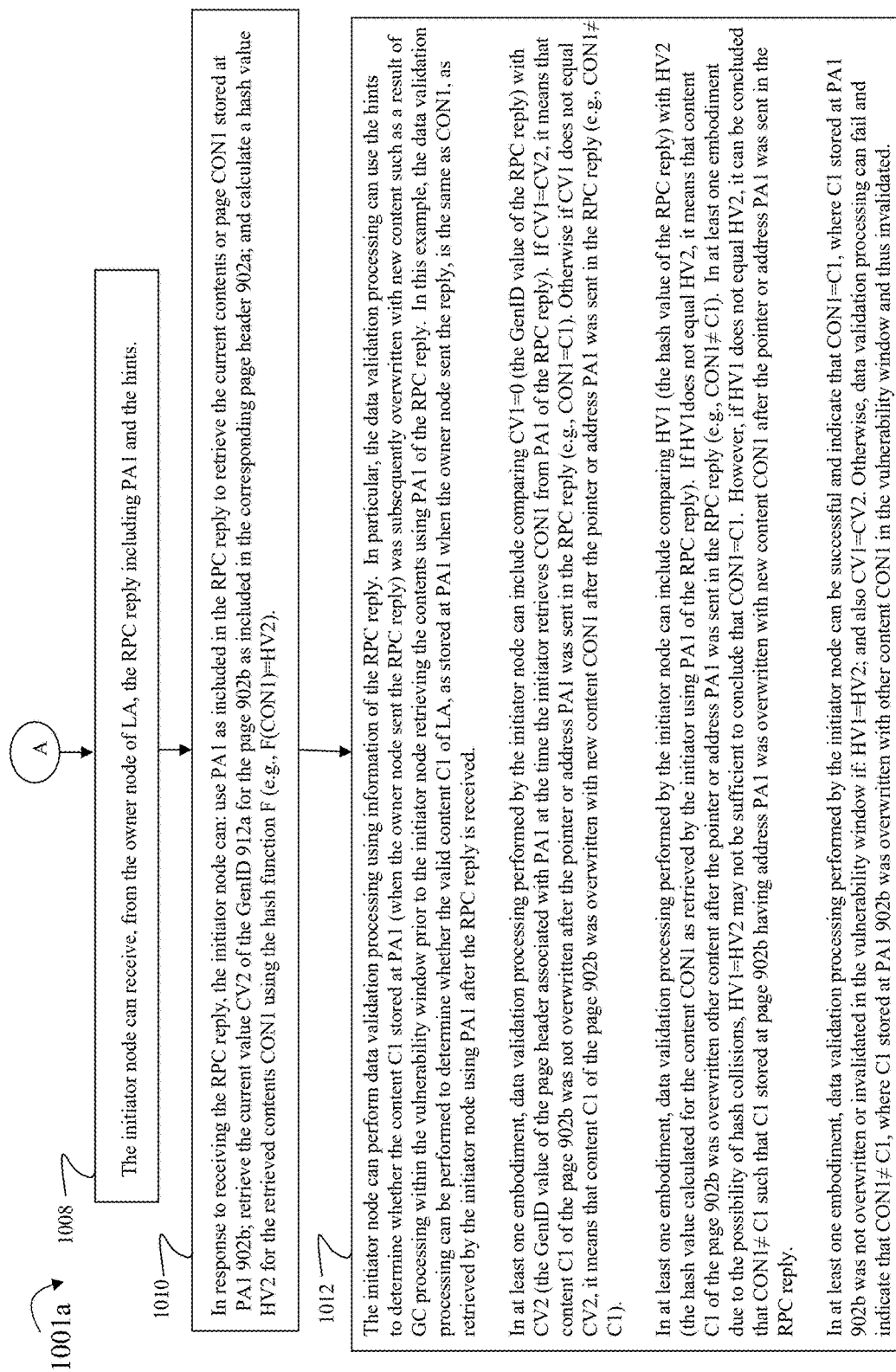
Figure 10C:
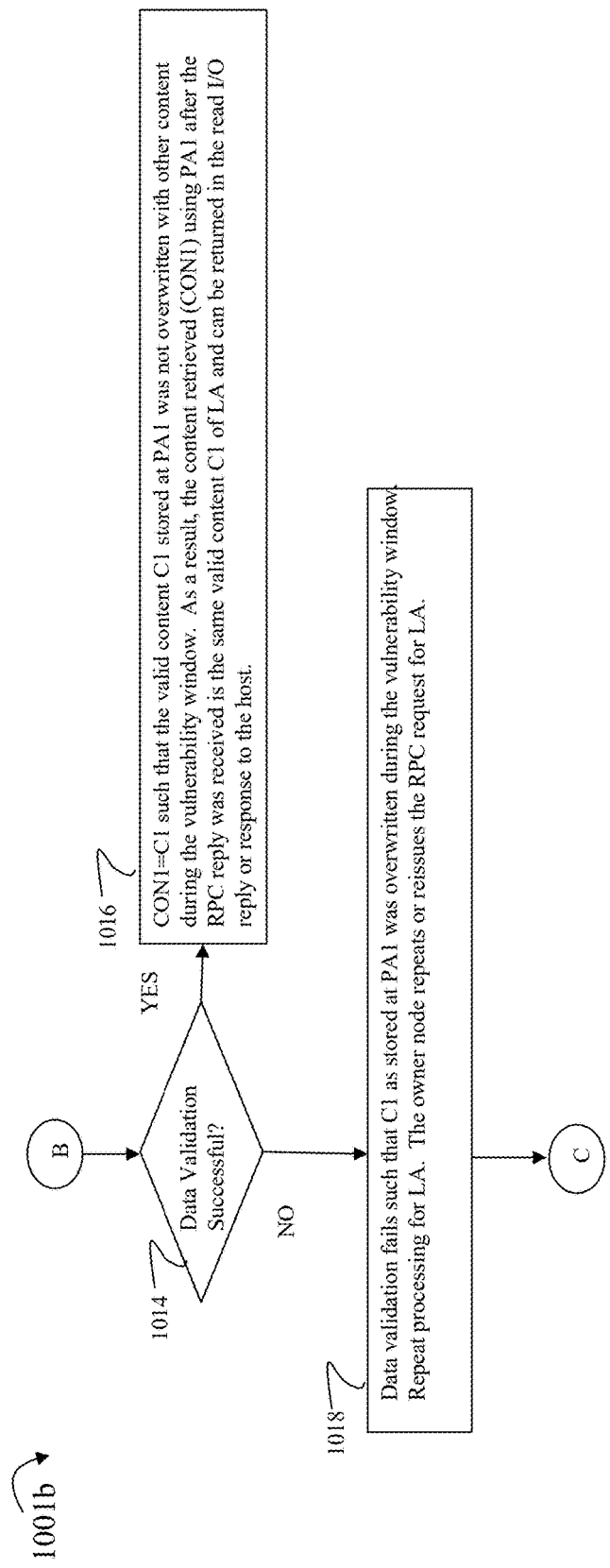

Referring to FIGS. 10A, 10B and 10C, shown is a flowchart 1000, 1001a 1001b of processing steps that can be performed in at least one embodiment in accordance with the techniques of the present disclosure.

At the step 1002, a write I/O operation W1 can be received that writes content C1 to the logical address LA. The write I/O can be received by a node of the storage system from a host. The write I/O can be recorded as an entry in the log and an acknowledgement for W1 can be returned to the host. Subsequently, the log entry for W1 is flushed. Flushing the log entry for W1 can include creating and/or updating the chain of MD pages of mapping information that map LA to PA1, a BE non-volatile storage location where C1 is stored.

With reference to FIGS. 8 and 9 as a result of flushing the log entry for W1, assume that C1 is stored in page 902b of PLB1. PA1 can be the physical address or location of the page 902b of PLB 901. When C1 is stored at PA1, PLB 901 can have a starting or base address BASE as stored in 803a with a corresponding PLB GenID=0 such that field 803b=0. When C1 is stored at PA1 in the step 1002, a corresponding VLB entry 802 for C1 can be determined and stored where the corresponding VLB entry 802 includes: a PLB offset or location 802a=OFF1, where PA1 corresponds to OFF1 of 802a and BASE of 803a; and a hash value 802b=HV1. The VLB entry 802 has a corresponding GenID 803b=0. The GenID 803b=0 can be the current value CV1=0 of the GenID fields 903a and 912a. The hash value HV1 stored in the field 802b can be determined using the hash function F as applied to C1 such that F(C1)=HV1 when C1 is stored at PA1. From the step 1002, control proceeds to the step 1004.

At the step 1004, an initiator node receives, from a host, a read I/O to read content from the logical address LA not owned by the initiator node but where LA is owned by the peer node. From the step 1004, control proceeds to the step 1005.

At the step 1005, the initiator node can send an RPC request to the peer owner node of LA to perform address resolution processing for LA. From the step 1005, control proceeds to the step 1006.

At the step 1006, the owner node receives the RPC request from the initiator. In response, the owner node can perform address resolution processing for LA. The address resolution processing can include traversing the chain of MD pages of mapping information used to map LA to its corresponding content C1 as stored at PA1 on BE non-volatile storage. The mapping information can include a VLB entry 802 associated with PA1 such that the VLB entry 802 is identified as a result of traversing the chain of MD pages associated with LA's address resolution processing. The VLB entry 802 can include PLB offset 802a=OFF1 and the corresponding VLB page common area 803 can include the PLB base address 803a=BASE. PA1 can denote the physical address of the current valid content C1 of LA, where PA1 is determined based, at least in part, on BASE of field 803a and OFF1 of field 802a. The VLB entry 802 can also include hash value 802b=HV1. The VLB entry 802's corresponding GenID for the PLB 901 can be 0 and stored in GenID 803b=0.

In the step 1006, the owner node of LA can return an RPC reply or response to the initiator node. The RPC reply or response can include hints and the current physical storage location or address PA1 denoting a PLB pointer or address of page 1 902b of the content C1, where C1 is stored at PA1 and where PA1 can be the physical address of the storage area 902b. The hints and physical storage location PA1 of the RPC reply returned by the owner node of LA can be determined using values read from i) the corresponding VLB entry 802 (e.g., as populated as a result of performing step 1002) and ii) the GenID 903b of the common area 803 of the VLB page 801 including the VLB entry 802. The hints can include the current GenID value CV1=0 read from the GenID 803b of the VLB page, where CV1=0 also denotes the current value of the GenID 912a corresponding to the page 902b. The hints can also include the hash value HV1 for the content C1, where HV1 of the RPC reply can be read from 802b of the VLB entry 802, and where HV1 corresponds to the content C1 as stored in 902b at PA1 in the PLB 901. Thus in at least one embodiment, the RPC reply returned by the owner node of LA to the initiator node can include: PA1 (e.g., BASE read from field 803a and OFF1 as read from field 802a); GenID CV1=0 (e.g., as read from field 803b); and HV1 as read from field 802b). From the step 1006, control proceeds to the step 1008.

At the step 1008, the initiator node can receive, from the owner node of LA, the RPC reply including PA1 and the hints. From the step 1008, control proceeds to the step 1010.

At the step 1010, in response to receiving the RPC reply, the initiator node can: use PA1 as included in the RPC reply to retrieve the current contents or page CON1 stored at PA1 902b; retrieve the current value CV2 of the GenID 912a for the page 902b as included in the corresponding page header 902a; and calculate a hash value HV2 for the retrieved contents CON1 using the hash function F (e.g., F(CON1)=HV2). From the step 1010, control proceeds to the step 1012.

At the step 1012, the initiator node can perform data validation processing using information of the RPC reply. In particular, the data validation processing can use the hints to determine whether the content C1 stored at PA1 (when the owner node sent the RPC reply) was subsequently overwritten with new content, such as a result of GC processing freeing or reclaiming the corresponding PLB, within the vulnerability window prior to the initiator node retrieving the contents using PA1 of the RPC reply. In this example, the data validation processing can be performed to determine whether the valid content C1 of LA, as stored at PA1 when the owner node sent the reply, is the same as CON1, as retrieved by the initiator node using PA1 after the RPC reply is received.

In at least one embodiment, data validation processing performed by the initiator node can include comparing CV1 (the GenID value of the RPC reply which has a current value of 0 in this example) with CV2 (the GenID value of the page header associated with PA1 at the time the initiator retrieves CON1 from PA1 of the RPC reply). If CV1=CV2, it means that content C1 of the page 902b was not overwritten after the pointer or address PA1 was sent in the RPC reply (e.g., CON1=C1). Otherwise if CV1 does not equal CV2, it means that content C1 of the page 902b was overwritten with new content CON1 after the pointer or address PA1 was sent in the RPC reply (e.g., CON1 C1).

In at least one embodiment, data validation processing performed by the initiator node can include comparing HV1 (the hash value of the RPC reply) with HV2 (the hash value calculated for the content CON1 as retrieved by the initiator using PA1 of the RPC reply). If HV1 does not equal HV2, it means that valid content C1 of the page 902b was overwritten with other content after the pointer or address PA1 was sent in the RPC reply (e.g., CON1 C1). In at least one embodiment due to the possibility of hash collisions, when HV1=HV2, it may not be sufficient to conclude that CON1=C1. However, if HV1 does not equal HV2, it can be concluded that CON1 C1 such that C1 stored at page 902b having address PA1 was overwritten with new content CON1 during the vulnerability window after the pointer or address PA1 was sent in the RPC reply.

In at least one embodiment, data validation processing performed by the initiator node can be successful and indicate that CON1=C1, where C1 stored at PA1 902b was not overwritten or invalidated in the vulnerability window if: HV1=HV2; and also CV1=CV2. Otherwise in at least one embodiment if both such conditions are not true, data validation processing can fail and indicate that CON1 C1, where C1 stored at PA1 902b was overwritten with other content CON1 in the vulnerability window and thus invalidated.

From the step 1012, control proceeds to the step 1014. At the step 1014, a determination is made as to whether data validation processing as performed in the step 1012 was successful. If successful where the step 1014 evaluates to yes, control proceeds to the step 1016.

At the step 1016 as a result of successful data validation, the content CON1, as read by the initiator node using PA1 after receiving the RPC reply, is determined to be the expected valid content C1, as read by the owner node prior to sending the RPC reply. In this case, the valid content C1 stored at PA1 was not overwritten with other content during the vulnerability window. As a result, the retrieved content CON1 retrieved using PA1 after the RPC reply was received is the valid content C1 of LA (where C1 denotes the content stored at PA1 when the owner node performed address resolution processing and returned the RPC reply or response to the initiator). As a result of the successful validation, the content CON1 (also the same as C1) retrieved by the initiator node using PA1 of the RPC reply can be returned in the read I/O reply or response to the host.

If data validation failed or was unsuccessful such that the step 1014 evaluates to no, control proceeds to the step 1018. At the step 1018, the data validation failure indicates that the expected valid content C1 as stored at PA1 was overwritten with other new content CON1 during or within the vulnerability window. In this case, processing for LA can be repeated where the owner node repeats or reissues the RPC request for LA. From the step 1018, control proceeds to the step 1005 to repeat processing.

In at least one embodiment, the GenID can be a single bit where the maximum number of times that PA1 can be overwritten during or within the vulnerability window of the read I/O workflow is 1. In this case, as a result of proceeding to the step 1005 and repeating processing of FIGS. 10A-10C a second time (e.g. one more additional time), it can be expected that data validation will be successful. For example, due to any race conditions and overwriting performed in the vulnerability window with the prior processing iteration, it can be expected that any needed updates to the mapping information used for LA, such as due to GC processing, have been completed such that the RPC request returned in the second iteration of processing of FIGS. 10A-C includes a physical address storing the expected valid content C1 of LA. In at least one such embodiment, if the second iteration of performing the processing of FIG. 10A-C again results in the step 1014 evaluating to no with data validation failure, processing can determine that an unrecoverable and/or unexpected error condition or state exists. In this latter case, a negative response or acknowledgement can be returned to the host in response to the read I/O where the response can denote an error condition and may not return any requested read data.

More generally in at least one embodiment, a limit can be placed on the number of repeated processing iterations performed in connection with proceeding to the step 1005 and repeating processing of FIGS. 10A-10C as result of data validation failure in the step 1014. Put another way in at least one embodiment, the limit can denote a maximum number of times that data validation of step 1014 can possibly fail due to allowable or expected conditions in accordance with the techniques of the present disclosure. Consistent with other discussion herein, such allowable or expected conditions can include race conditions and/or overwrites of a physical address or location such as PA1 in a PLB.

In at least one embodiment, content or UD stored in a PLB 901 can be stored in an uncompressed form or a compressed form as can vary with embodiment. In at least one embodiment, if each page of UD or content stored in the PLB 901 is uncompressed, the size of each such page can be the same and known. In at least one embodiment, if a page of UD or content is compressed when stored in the PLB 901, the compressed size of each compressed UD page as stored in the PLB can vary. In this latter case where the UD page is compressed, the PLB address or pointer as used herein can further include an associated length or size. For example for a compressed UD page as stored in the PLB, the RPC reply and the VLB entry can include the PLB address or pointer to the UD page and can also further include an associated length or size of the compressed form of the UD page as stored in the PLB. Additionally, in embodiments where the UD page stored in a PLB is compressed, processing as described herein can further include using the PLB address or pointer and length to retrieve the compressed UD page, and then perform decompression processing to obtain an original, decompressed, or uncompressed form of the respective UD page. The uncompressed form of the UD page can be used in connection with other processing described herein such as, for example, computing a corresponding hash value for the UD page, returning the uncompressed UD page as the requested read data to the host, and the like. In at least one embodiment where a compressed UD page is stored in the PLB, the compressed UD page's corresponding page header can also include the size or length of the compressed UD page of the PLB.

The foregoing such as in connection with FIGS. 10A-10C describes an embodiment where each UD page of content stored in the PLB includes a corresponding page header such as illustrated in FIG. 9. In at least one embodiment, such page headers can be maintained and used in connection with compressed and/or uncompressed UD pages as stored in PLBs.

As a variation in at least one embodiment, page headers may not be maintained and used in connection with UD pages, such as uncompressed UD pages as stored in a PLB. In such an embodiment without page headers where the GenID is a single bit, an approach can be used in accordance with the present disclosure to maintain the GenID of each UD page (uncompressed) within the UD page itself. In at least one embodiment, when flushing the write of the UD page from the log (e.g., step 1002): a) the first bit of the UD page or content can be additionally copied and stored in an additional "first bit" field 802c of the corresponding VLB entry 802; and b) the first bit of the UD page can be replaced with the corresponding single bit GenID of the PLB including the UD page. In this manner in at least one embodiment without page headers, the GenID of the PLB of a UD page can be embedded or included in the stored UD page. Additionally, the actual first bit of the UD page can be extracted from the UD page and preserved or retained in the first bit field 802c of a corresponding VLB entry associated with the UD page.

Additionally in such an embodiment without page headers, the first bit of the UD page as stored in the first bit field 802c of the corresponding VLB entry 802 can also be returned (e.g., step 1006, 1008) as an additional hint in the RPC reply from the owner node to the initiator node. The first bit returned as an additional hint in the RPC reply can be read from the corresponding VLB entry 802 along with other stored information corresponding to the VLB entry 802, where the stored information can include the PLB pointer or address and other hints (e.g., values of 802a-b of the VLB entry 802 and value of GenID 803b).

In the read I/O workflow in accordance with the techniques of the present disclosure such as described, for example, in connection with FIGS. 10A-10C, after the UD page or content is read by the initiator node from the PLB (e.g., in the step 1010) using PA1 as included in the RPC reply, the original UD page can be restored by copying the first bit of the UD page from the corresponding VLB entry to the first bit of the UD page thereby restoring the original UD page content. In the step 1010 in at least one such embodiment, the first bit of the UD page as read from the VLB entry by the owner node can be included in the hints of the RPC reply, where the first bit of UD page included in the RPC reply hints can be copied to the first bit of the UD page to restore the UD page.

Further in such an embodiment without page headers where the GenID is stored or embedded as a single bit of the UD page, processing described herein such as in connection with the step 1012 for data validation processing can obtain the UD page's GenID from the first bit of the UD page (prior to restoring the UD page) to compare to the GenID of the RPC reply.

In an embodiment where the GenID field is more than a single bit, the foregoing can be extended and modified in straightforward manner to accommodate the number of bits of the GenID.

Figure 11A:
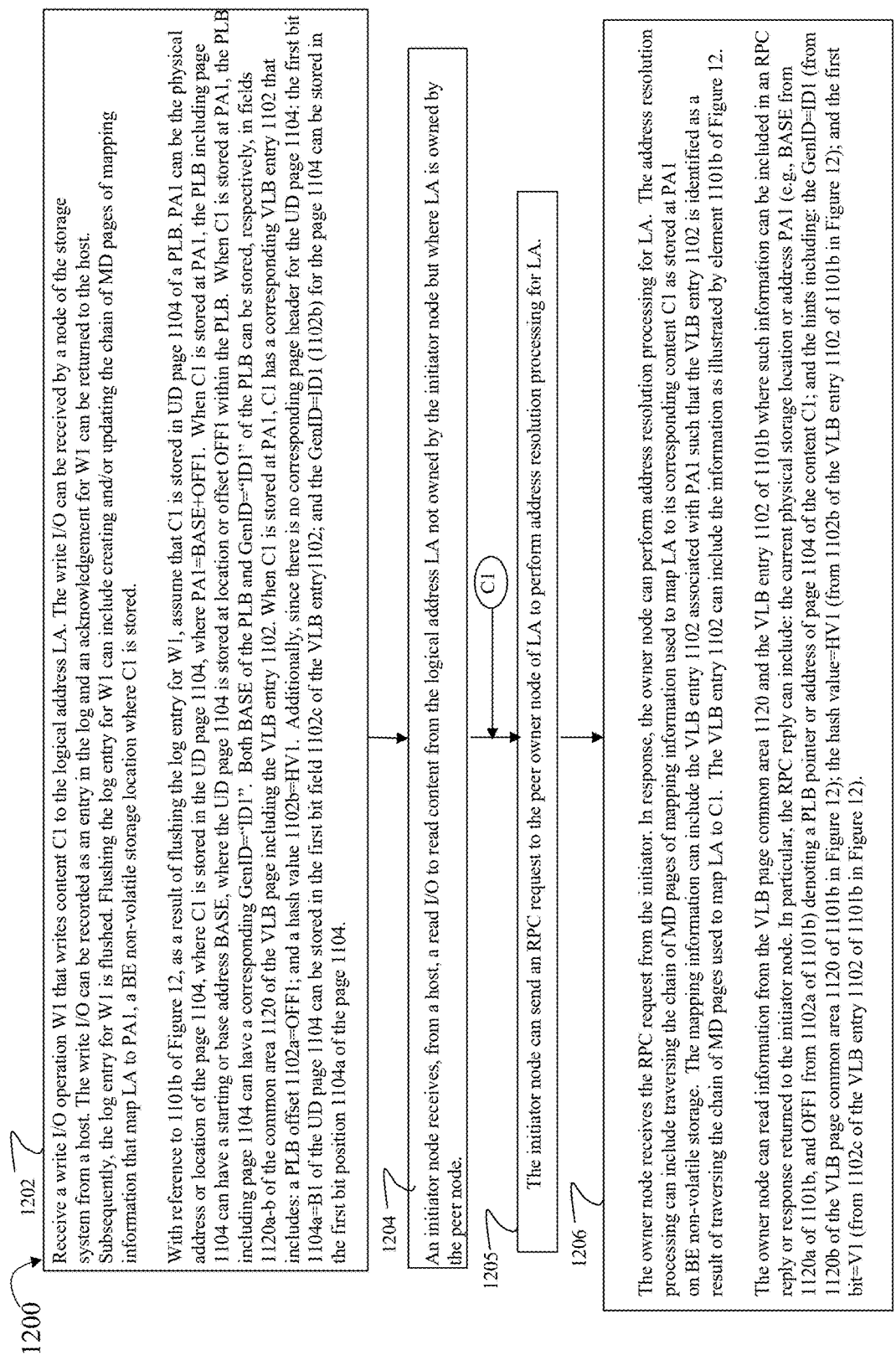
Figure 11B:
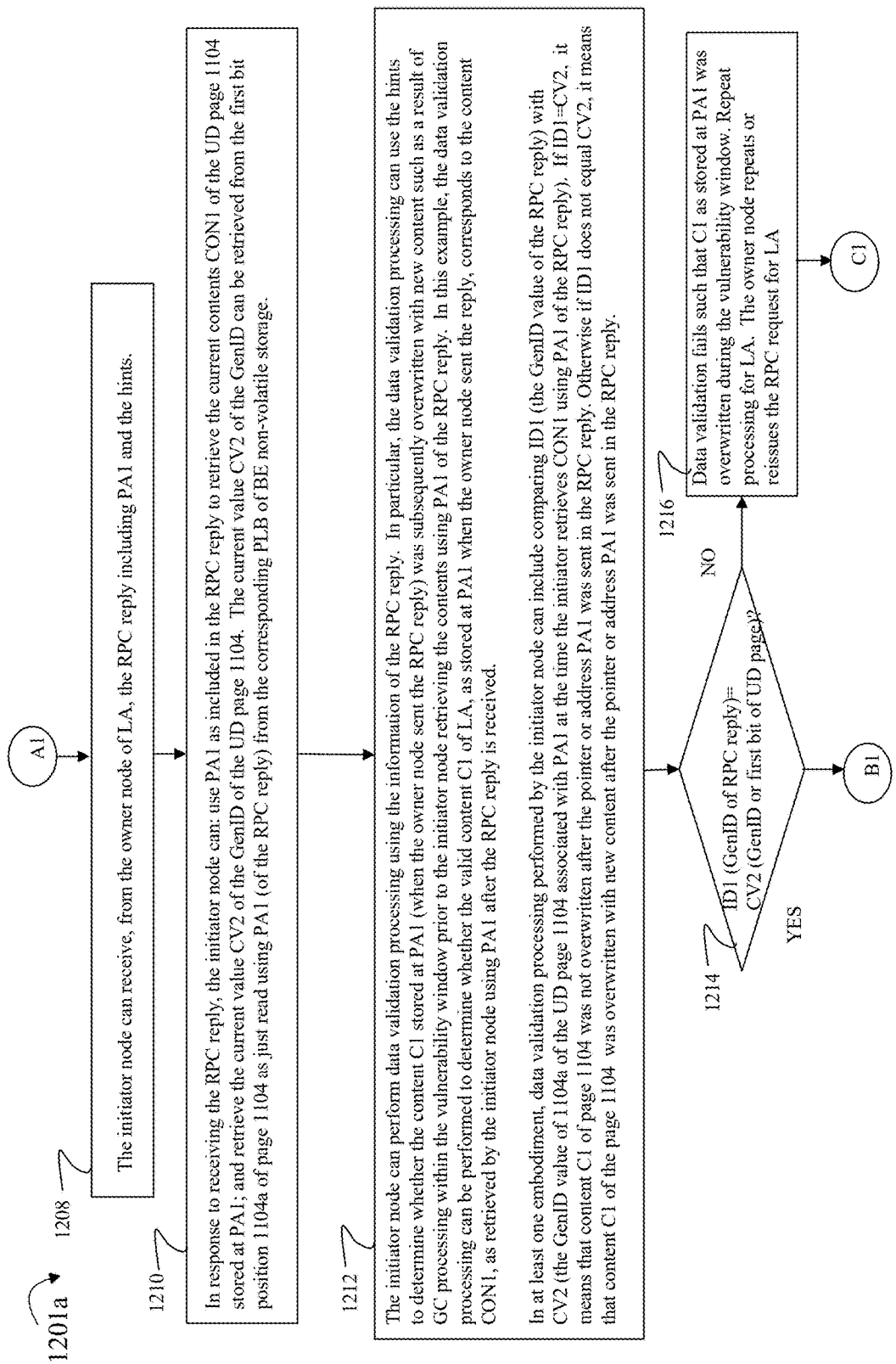
Figure 11C:
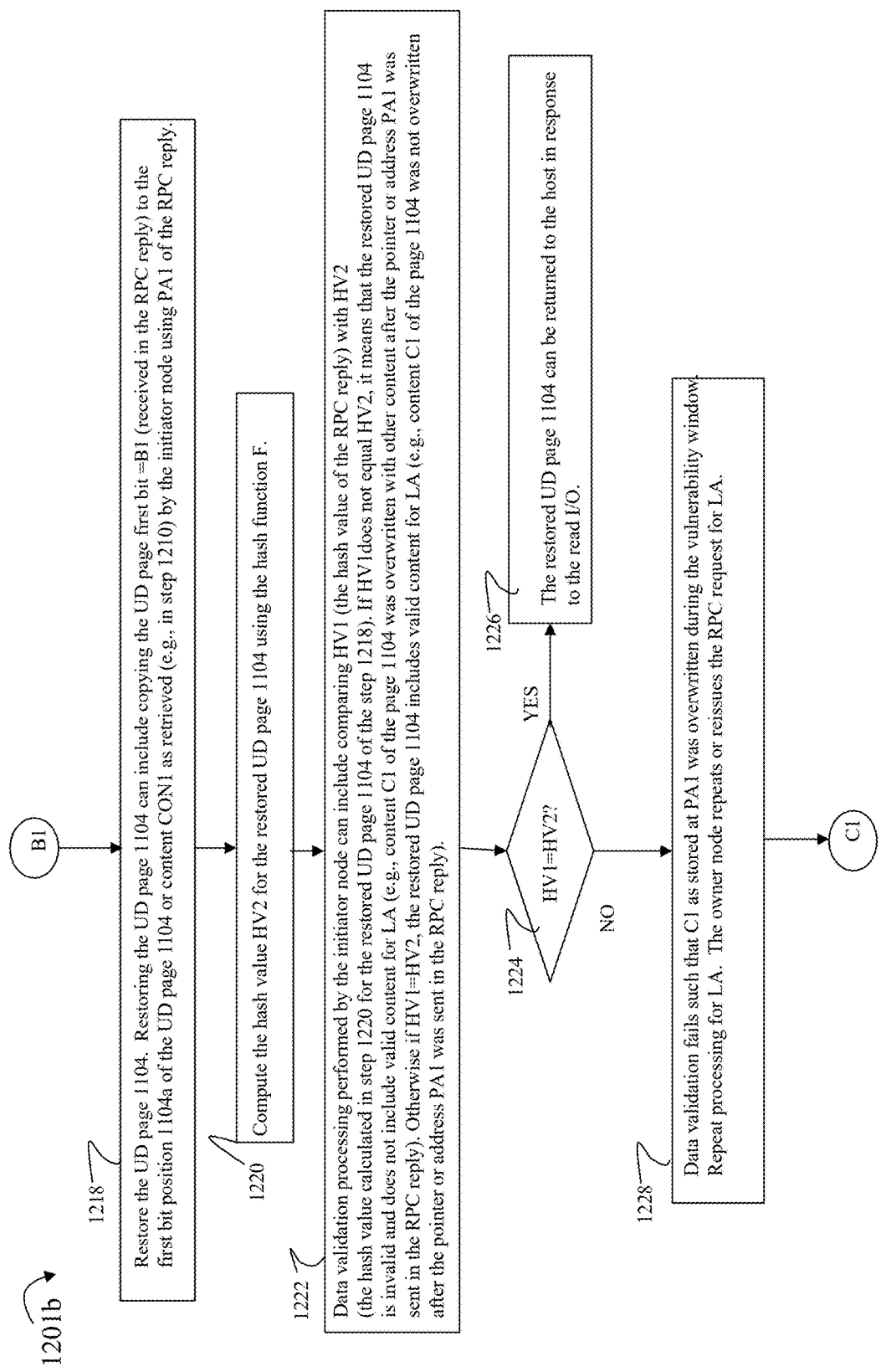

Referring to FIGS. 11A-11C, shown is a flowchart of processing steps 1200, 1201a, 1201b that can be performed in at least one embodiment in accordance with the techniques of the present disclosure that does not maintain and does not use page headers for pages UD or content stored in PLBs.

Generally, the processing of FIGS. 11A-C is similar to the processing of FIGS. 10A-C with modifications or differences to account for not using page headers.

At the step 1202, a write I/O operation W1 can be received that writes content C1 to the logical address LA. The write I/O can be received by a node of the storage system from a host. The write I/O can be recorded as an entry in the log and an acknowledgement for W1 can be returned to the host. Subsequently, the log entry for W1 is flushed. Flushing the log entry for W1 can include creating and/or updating the chain of MD pages of mapping information that map LA to PA1, a BE non-volatile storage location where C1 is stored.

Figure 12:
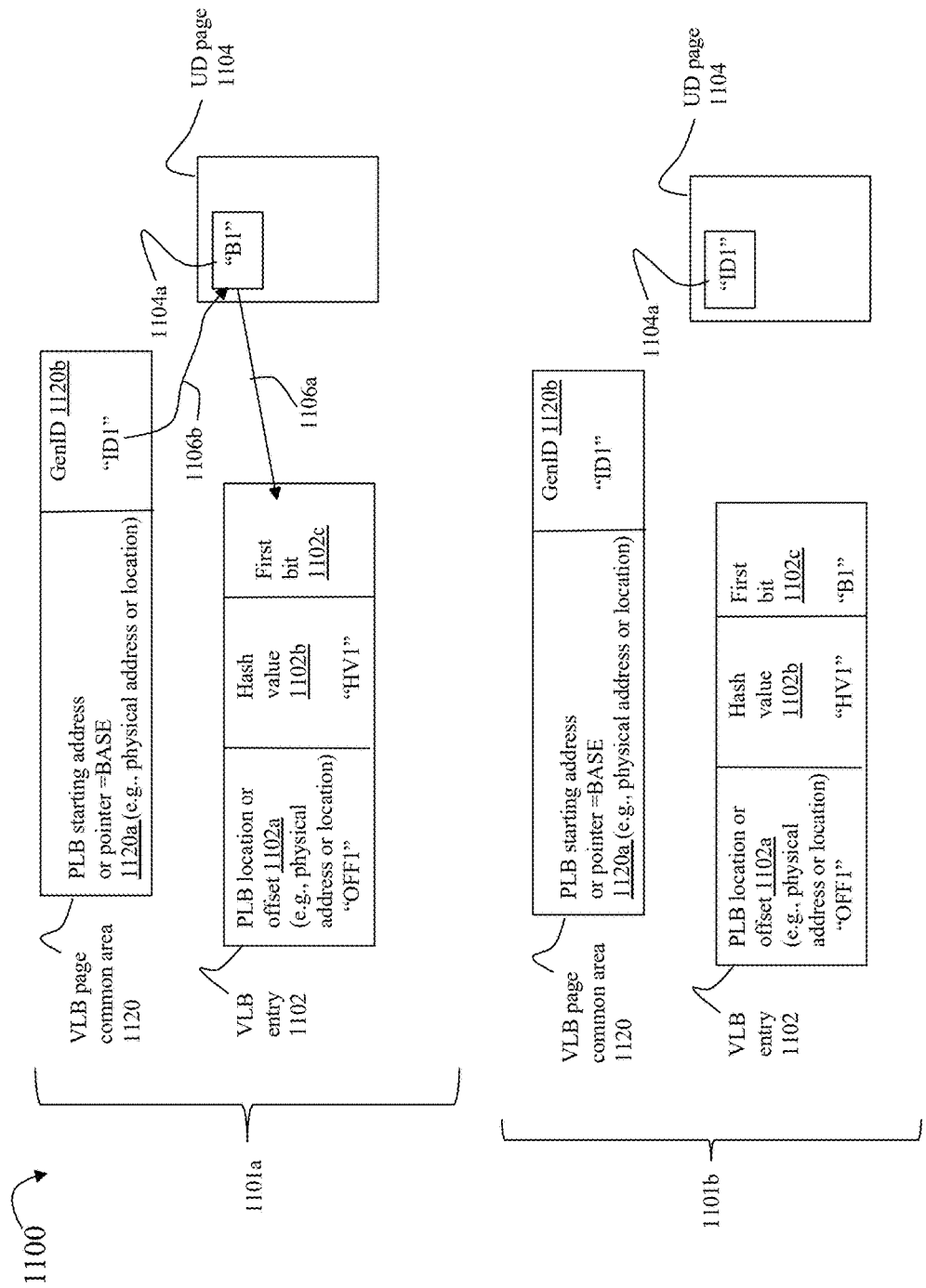

Referring to FIG. 12, shown is an example 1100 illustrating structures and associated processing that can be performed in at least one embodiment in accordance with the techniques of the present disclosure that does not maintain and does not use page headers for pages of UD or content stored in PLBs.

The example 1100 illustrates processing that can be performed in connection with writing content or UD to the UD page 1104 included in a PLB without using a corresponding page header. A write such as the write W1 (step 1202) can be received at a storage system from a host that writes content C1 to the logical address LA. A log entry for W1 can be stored in a log and a write acknowledgement for W1 returned to the host. Subsequently, the log entry for W1 can be flushed from the log resulting in creating and/or updating the chain of MD pages of mapping information that map LA to a corresponding PLB address PA1 where C1 is stored. In connection with storing C1 and creating and updating the associated structures of mapping information, processing can include storing the content C1 in the UD page 1104 having a corresponding PLB address of PA1, and can include updating the corresponding VLB entry 1102. The VLB entry 1102 can be included in a VLB page of the chain of MD pages of mapping information used to map LA to PA1 where C1 is stored. PA1 can be expressed using the PLB base address or pointer, BASE, and a corresponding location or offset, OFF1, within the PLB.

The element 1101a can denote the state of structures 1102, 1104, and 1120 at one step in the process of flushing the log entry for W1 at a first point in time T11. The element 1101b can denote the state of structures 1102, 1104, 1120 in a next step at a second point in time T12 subsequent to T11 in the processing of flushing the log entry for W1. In particular, the element 1101a indicates that the VLB page common area 1120 (of the VLB page including the VLB entry 1102) includes i) a PLB starting address or pointer 1120a=BASE and ii) a GenID 1120b="ID1", where ID1 denotes the current GenID of the PLB including the UD page 1104. The element 1101a also indicates that the VLB 1102 includes i) the PLB location or offset 1102a=OFF1, where PA1 identifies the PLB address of the UD page 1104, and where PA1=BASE (1120a) +OFF1 (1102a). The content C1 can be stored in the UD page 1104 that includes a first bit of content or data 1104a having a value denoted as B1. The VLB entry 1102 also includes the hash value 1102b=HV1, where HV1 denotes the hash value for C1 (e.g., F(C1)=HV1). The first bit field 1102c can be updated (as denoted by 1106a) to store the first bit "B1" 1104a of the UD page 1104, and the first bit position 1104a of the UD page 1104 can be updated (1106b) to store the GenID of ID1 corresponding to the UD page 1104 (e.g., where ID1 is the current GenID of the PLB that includes the UD page 1104).

The element 1101b denotes the state of the VLB 1102 and UD page 1104 after performing the processing of storing (1106a) the corresponding value, B1, in the first bit field 1102c of the VLB entry 1102; and storing (1106b) the corresponding value ID1, in the first bit position 1104a of the UD page 1104.

Thus element 1101b of FIG. 12 can denote the state of the structures 1102, 1104, 1120 after flushing W1 from the log and after performing the step 1202. With reference to 1101b of FIG. 12, as a result of flushing the log entry for W1, assume that C1 is stored in UD page 1104 of a PLB. PA1 can be the physical address or location of the page 1104, where C1 is stored in the UD page 1104, and where PA1=BASE+OFF1. When C1 is stored at PA1, the PLB including page 1104 can have a starting or base address BASE, where the UD page 1104 is stored at location or offset OFF1 within the PLB. When C1 is stored at PA1, the PLB including page 1104 can have a corresponding GenID="ID1". Both BASE of the PLB and GenID="ID1" of the PLB can be stored, respectively, in fields 1120a-b of the common area 1120 of the VLB page including the VLB entry 1102. When C1 is stored at PA1, C1 has a corresponding VLB entry 1102 that includes: a PLB offset 1102a=OFF1; and a hash value 1102b=HV1. Additionally, since there is no corresponding page header for the UD page 1104: the first bit 1104a=B1 of the UD page 1104 can be stored in the first bit field 1102c of the VLB entry1102; and the GenID=ID1 (1102b) for the page 1104 can be stored in the first bit position 1104a of the page 1104.

Returning now to FIG. 11A and following the step 1202, control proceeds to the step 1204. At the step 1204, an initiator node receives, from a host, a read I/O to read content from the logical address LA not owned by the initiator node but where LA is owned by the peer node. From the step 1204, control proceeds to the step 1205.

At the step 1205, the initiator node can send an RPC request to the peer owner node of LA to perform address resolution processing for LA. From the step 1205, control proceeds to the step 1206.

At the step 1206, the owner node receives the RPC request from the initiator. In response, the owner node can perform address resolution processing for LA. The address resolution processing can include traversing the chain of MD pages of mapping information used to map LA to its corresponding content C1 as stored at PA1 on BE non-volatile storage. The mapping information can include the VLB entry 1102 associated with PA1 such that the VLB entry 1102 is identified as a result of traversing the chain of MD pages used to map LA to C1. The VLB entry 1102 can include the information as illustrated by element 1101b of FIG. 12.

In the step 1206, the owner node can read information from the VLB page common area 1120 and the VLB entry 1102 of 1101b where such information can be included in an RPC reply or response returned to the initiator node. In particular, the RPC reply can include: the current physical storage location or address PA1 (e.g., BASE from 1120a of 1101b, and OFF1 from 1102a of 1101b) denoting a PLB pointer or address of page 1104 of the content C1; and the hints including: the GenID=ID1 (from 1120b of the VLB page common area 1120 of 1101b in FIG. 12); the hash value=HV1 (from 1102b of the VLB entry 1102 of 1101b in FIG. 12); and the first bit=V1 (from 1102c of the VLB entry 1102 of 1101b in FIG. 12). From the step 1206, control proceeds to the step 1208.

At the step 1208, the initiator node can receive, from the owner node of LA, the RPC reply including PA1 and the hints. From the step 1208, control proceeds to the step 1210.

At the step 1210, in response to receiving the RPC reply, the initiator node can: use PA1 as included in the RPC reply to retrieve the current contents CON1 of the UD page 1104 stored at PA1; and retrieve the current value CV2 of the GenID of the UD page 1104. CV2 can denote the value stored in the first bit position 1104a of the current contents C1 of the page 1104 as just retrieved by the initiator node using PA1 of the RPC reply. (e.g., The current value CV2 of the GenID of page 1104 can be retrieved from the first bit position 1104a of page 1104 as just read using PA1 (of the RPC reply) from the corresponding PLB of BE non-volatile storage). From the step 1210, control proceeds to the step 1212.

At the step 1212, the initiator node can perform data validation processing using the information of the RPC reply. In particular, the data validation processing can use the hints to determine whether the content C1 stored at PA1 (when the owner node sent the RPC reply) was subsequently overwritten with new content such as a result of GC processing within the vulnerability window prior to the initiator node retrieving the contents using PA1 of the RPC reply. In this example, the data validation processing can be performed to determine whether the valid content C1 of LA, as stored at PA1 when the owner node sent the reply, corresponds to the content CON1, as retrieved by the initiator node using PA1 after the RPC reply is received.

In at least one embodiment, data validation processing performed by the initiator node can include comparing ID1 (the GenID value of the RPC reply) with CV2 (the GenID value of 1104a of the UD page 1104 associated with PA1 at the time the initiator retrieves CON1 using PA1 of the RPC reply). If ID1=CV2, it means that content C1 of page 1104 was not overwritten after the pointer or address PA1 was sent in the RPC reply. Otherwise if ID1 does not equal CV2, it means that content C1 of the page 1104 was overwritten with new content after the pointer or address PA1 was sent in the RPC reply.

From the step 1212, control proceeds to the step 1214. At the step 1214, processing can be performed by the initiator node to determine whether ID1 (e.g., GenID of RPC reply) matches or is equal to CV2 (e.g., the GenID or first bit of UD page). If the step 1212 evaluates to no, control proceeds to the step 1216.

At the step 1216, data validation fails such that C1 as stored at PA1 was overwritten during or within the vulnerability window. Repeat processing for LA. The owner node repeats or reissues the RPC request for LA. From the step 1216, control proceeds to the step 1205.

If the step 1212 evaluates to yes, control proceeds to the step 1218. At the step 1218, processing can be performed by the initiator node to restore the UD page 1104. Restoring the UD page 1104 can include copying the UD page first bit=B1 (received in the RPC reply) to the first bit position 1104a of the UD page 1104 or content CON1 as retrieved (e.g., in step 1210) by the initiator node using PA1 of the RPC reply. From the step 1218, control proceeds to the step 1220.

At the step 1220, the initiator node can compute the hash value HV2 for the restored UD page 1104 using the hash function F. From the step 1220, control proceeds to the step 1222.

At the step 1222, data validation processing performed by the initiator node can include comparing HV1 (the hash value of the RPC reply) with HV2 (the hash value calculated in step 1220 for the restored UD page 1104 of the step 1218). If HV1 does not equal HV2, it means that the restored UD page 1104 is invalid and does not include valid content for LA (e.g., content C1 of the page 1104 was overwritten with other content after the pointer or address PA1 was sent in the RPC reply). Otherwise if HV1=HV2, the restored UD page 1104 includes valid content for LA (e.g., content C1 of the page 1104 was not overwritten after the pointer or address PA1 was sent in the RPC reply). From the step 1222, control proceeds to the step 1224.

At the step 1224, a determination is made as to whether HV1 matches HV2 such that HV1=HV2. If the step 1224 evaluates to yes, control proceeds to the step 1226. At the step 1226, the restored UD page 1104 can be returned to the host in response to the read I/O.

If the step 1224 evaluates to no, control proceeds to the step 1228. At the step 1228, data validation fails such that C1 as stored at PA1 was overwritten during or within the vulnerability window. As a result, processing can be repeated for LA. The owner node repeats or reissues the RPC request for LA. From the step 1228, control proceeds to the step 1205.

In a manner similar to the embodiment described above such as in connection with FIGS. 10A-10C which uses page headers, the embodiment just described in connection with FIGS. 11A-11C without using page headers can be used in connection with storing uncompressed UD pages or content in PLBs. More generally, the processing of FIGS. 11A-11C can be used in connection with an embodiment that stores, embeds or includes the GenID of a UD page of a PLB within the UD page. In at least one embodiment, page headers can be used in connection with compressed and/or uncompressed UD pages stored in PLBs. In at least one embodiment without page headers, only uncompressed UD pages can be stored in PLBs due to the varying sizes of the stored compressed UD pages. In this latter case, the page header of a compressed UD page can include the length or size of the compressed UD page.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
receiving, at a first of a plurality of nodes, a read input/output (I/O) operation that requests to read current content stored at a target logical address (LA), wherein the first node does not own the target LA and wherein a second node of the plurality of nodes owns the target LA; and
performing read processing for the read I/O operation, including:
sending a first request from the first node to the second node that owns the target LA;
in response to receiving the first request, the second node performing first processing including:
performing address resolution processing using first mapping information for the target LA that maps the target LA to corresponding first content C1 stored at the target LA, wherein the first mapping information includes: i) a first physical address PA1 of a first data page P1 of a first physical large block (PLB) of non-volatile storage where C1 is stored in P1, ii) a first value V1 of a first generation identifier GenID1 of the first PLB and P1, and iii) a hash value field that includes a first hash value HV1 corresponding to C1; and
returning a first reply from the second node to the first node, wherein the first reply includes first information comprising: i) PA1, and ii) first hints including V1 and HV1; and
in response to receiving the first reply, the first node performing second processing including:
using PA1 of the first reply, retrieving first current content stored at PA1;
determining, using the first hints of the first information of the first reply, whether C1 stored at PA1 was overwritten with the first current content during a vulnerability window between a first point in time T1 when the first reply is returned by the second node and a second point in time T2 when the first node performs said retrieving that retrieves the first current content stored at PA1 using PA1 of the first reply, wherein said determining whether C1 stored at PA1 was overwritten with the first current content during the vulnerability window includes performing data validation processing of the first current content with respect to C1 using the first hints; and
responsive to determining that C1 stored at PA1 was not overwritten with the first current content during the vulnerability window such that the first current content is C1 and denotes valid content of LA, returning the first current content in response to the read I/O operation.

2. The computer-implemented method of claim 1, wherein V1 denotes a current value of GenID1 corresponding to the first PLB and all data pages of the first PLB at the first point in time T1.

3. The computer-implemented method of claim 2, wherein the current value of GenID1 is incremented by 1 each time the first PLB is reclaimed by garbage collection processing for subsequent reuse in storing new content including overwriting any content stored in P1 located at PA1 within the first PLB.

4. The computer-implemented method of claim 3, wherein the first PLB is included in a first plurality of PLBs of back-end non-volatile storage, and the method further includes:
performing said garbage collection processing on the first plurality of PLBs, wherein said garbage collection processing includes:
moving first valid content of the first PLB to a second PLB of the first plurality of PLBs, wherein the first valid content includes C1, wherein as a result of said garbage collection processing, the first PLB is freed and available for reuse.

5. The computer-implemented method of claim 4, further comprising:
after said garbage collection processing frees the first PLB, storing second content C2 at PA1 on the first PLB such that C2 overwrites C1.

6. The computer-implemented method of claim 5, wherein C2 is stored, by said storing, in P1 located at PA1 of the first PLB after the second point in time T2 such that i) C1 as stored at PA1 is not overwritten with C2 by said storing during the vulnerability window, ii) C1 as stored in PA1 is overwritten with C2 by said storing after the first node performs said retrieving using PA1 of the first reply, and iii) C1 is the first current content; and wherein said determining whether C1 stored at PA1 was overwritten during the vulnerability window determines that C1 was not overwritten with the first current content during the vulnerability window.

7. The computer-implemented method of claim 5, wherein C2 is stored, by said storing, in P1 located at PA1 of the first PLB during the vulnerability window such that C2 is the first current content; and wherein said determining whether C1 stored at PA1 was overwritten during the vulnerability window determines that C1 was overwritten with the first current content during the vulnerability window.

8. The computer-implemented method of claim 1, wherein during the vulnerability window, P1 located at PA1 is not locked such that C1, as stored in P1, is allowed to be overwritten with other content thereby invalidating P1 and PA1 with respect to the target LA such that PA1 does not reference current valid content of the target LA.

9. The computer-implemented method of claim 1, wherein said data validation processing determines whether C1, as stored in P1 that is located at PA1 in the first PLB, has been overwritten by the first current content during the vulnerability window and thus invalidated with respect to the target LA, and wherein said data validation processing includes:

receiving V2 denoting a GenID of P1 of the first PLB;
    determining whether V1 of the RPC reply equals V2; and
    responsive to determining that V1 does not equal V2, determining that C1, as stored in P1 located at PA1, has been overwritten with the first current content such that PA1 does not correspond to valid content of the target LA.

10. The computer-implemented method of claim 9, wherein V2 is included in a page header associated with P1 of the first PLB.

11. The computer-implemented method of claim 9, further comprising:

calculating a second hash value HV2 for the first current content;
    determining whether HV1=HV2; and
    responsive to determining that HV1 does not equal HV2, determining that C1, as stored in P1 located at PA1, has been overwritten with the first current content such that PA1 does not correspond to valid content of the target LA.

12. The computer-implemented method of claim 11, further comprising:

responsive to determining that i) HV1=HV2 and ii) V1=V2, determining that C1, as stored in P1 located at PA1, has not been overwritten by the first current content such that i) PA1 corresponds to valid content of the target LA, and ii) the first current content is C1.

13. The computer-implemented method of claim 1, wherein, in said second processing, responsive to determining that C1 stored at PA1 was overwritten by the first current content during the vulnerability window, performing additional processing including:

sending a second request from the first node to the second node that owns the target LA;

in response to receiving the second request, the second node performing third processing including:

performing second address resolution processing using second mapping information for the target LA that maps the target LA to C1 stored at the target LA, wherein the second mapping information includes i) a second physical address PA2 of a second data page P2 of a second PLB of non-volatile storage where C1 is stored in P2, ii) a second value V2 of a second generation identifier GenID2 of the second PLB and P2, and iii) HV1 corresponding to C1; and returning a second reply from the second node to the first node, wherein the second reply includes second information comprising: i) PA2, and ii) second hints including V2 and HV1; and in response to receiving the second reply, the first node performing fourth processing including:

using PA2 of the second reply, retrieving third content C3 stored at PA2;

determining, using the second hints of the second information of the second reply, whether C1 stored at PA2 was overwritten with C3 during a second vulnerability window between a third point in time T3 when the second reply is returned by the first node and a fourth point in time T4 when the second node retrieves C3 stored at PA2 using PA2 of the second reply, wherein said determining whether C1 stored at PA2 was overwritten with C3 during the second vulnerability window includes performing second data validation processing of C3 with respect to C1 using the second hints; and responsive to determining that C1 stored at PA2 was not overwritten with C3 during the vulnerability window such that C3 is C1 and denotes valid content of the target LA, returning C3 in response to the read I/O operation.

14. The computer-implemented method of claim 1, wherein said retrieving the first current content stored at PA1 includes:

reading a compressed form of the first content from PA1; and
    decompressing the compressed form of the first content.

15. One or more non-transitory computer readable media comprising code stored thereon that, when executed, performs a method comprising:

receiving, at a storage system, a write I/O that writes first content C1 to a logical address (LA);

responsive to said receiving said write I/O, performing first processing including:

determining a modified version of C1 including replacing first data of C1 with a first value V1 of a first generation identifier GenID1 of a first physical large block (PLB) of storage such that V1 is embedded within the modified version of C1;

storing the modified version of C1 at a first physical address PA1 of a first page P1 of storage of the first PLB, wherein V1 is included in the modified version of C1 at a first location or position of P1; and updating first mapping information that maps the LA to PA1, wherein after said updating, the first mapping information includes: i) PA1 indicating that current content of the LA is stored at PA1, ii) V1 denoting a current generation of the first PLB and P1 at a point in time corresponding to when said storing is performed, iii) a first hash value HV1 corresponding to C1, and iv) the first data of C1 that is replaced with V1 in the modified version of C1;

receiving, at a first node of the storage system, a read I/O requesting to read current contents of the LA, wherein the first node does not own the LA and wherein the LA is owned by a second node of the storage system; and responsive to said receiving the read I/O, performing third processing including:

sending a first request from the first node to the second node that owns the LA;

in response to receiving the first request, the second node performing first processing including:

performing address resolution processing using the first mapping information for the LA; and returning a first reply from the second node to the first node, wherein the first reply includes first information comprising: i) PA1, and ii) first hints including V1, HV1, and the first data; and in response to receiving the first reply, the first node performing fourth processing including:

using PA1 of the first reply, retrieving first current content of P1 stored at PA1;

determining, using the first hints of the first information of the first reply, whether the modified version of C1 stored at PA1 was overwritten with the first current content during a vulnerability window between a first point in time T1 when the first reply is returned by the second node and a second point in time T2 when the first node performs said retrieving that retrieves the first current content stored at PA1 using PA1 of the first reply; and responsive to determining that modified version of C1 stored at PA1 was not overwritten with the first current content during the vulnerability window such that the first current content is C1 and denotes valid content of the LA, returning a restored version of the first current content in response to the read I/O operation.

16. The one or more non-transitory computer readable media of claim 15, wherein said determining whether C1 stored at PA1 was overwritten with the first current content includes:

extracting a current generation value for P1 from the first location or position of the first current content;

determining whether the current generation value for P1 matches V1 as returned in the first reply; and responsive to determining that the current generation value does not match V1, determining that the modified version of C1 stored at PA1 was overwritten with the first current content during the vulnerability window.

17. The one or more non-transitory computer readable media of claim 16, wherein said determining whether C1 stored at PA1 was overwritten with the first current content includes:

responsive to determining that the current generation value matches V1, performing restoration processing to restore P1 including:

generating restored content of P1 including copying the first data of the first reply to the first location or position of the first current content;

computing a second hash value HV2 for the restored content;

determining whether HV2 matches HV1 of the first reply; and responsive to determining that HV2 does not match HV1, determining that the modified version of C1 stored at PA1 was overwritten with the first current content during the vulnerability window.

18. The one or more non-transitory computer readable media of claim 17, wherein said determining whether C1 stored at PA1 was overwritten with the first current content includes:

responsive to determining that HV2 matches HV1, performing other processing including:

determining that the modified version of C1 stored at PA1 was not overwritten with the first content during the vulnerability window; and performing said returning that returns the restored content as the restored version of the first current content in response to the read I/O operation, wherein the restored version of the first content is C1.

19. The one or more non-transitory computer readable media of claim 15, wherein said storing the modified version of C1 at PA1 of P1 of the first PLB stores the modified version of C1 in an uncompressed form.

20. A system comprising:

one or more processors; and one or more memories comprising code stored thereon that, when executed, performs a method comprising:

receiving, at a first of a plurality of nodes, a read I/O operation that requests to read current content stored at a target logical address (LA), wherein the first node does not own the target LA and wherein a second node of the plurality of nodes owns the target LA; and performing read processing for the read I/O operation, including:

sending a first request from the first node to the second node that owns the target LA;

in response to receiving the first request, the second node performing first processing including:

performing address resolution processing using first mapping information for the target LA that maps the target LA to corresponding first content C1 stored at the target LA, wherein the first mapping information includes: i) a first physical address PA1 of a first data page P1 of a first physical large block (PLB) of non-volatile storage where C1 is stored in P1, ii) a first value V1 of a first generation identifier GenID1 of the first PLB and P1, and iii) a hash value field that includes a first hash value HV1 corresponding to C1; and returning a first reply from the second node to the first node, wherein the first reply includes first information comprising: i) PA1, and ii) first hints including V1 and HV1; and in response to receiving the first reply, the first node performing second processing including:

using PA1 of the first reply, retrieving first current content stored at PA1;

determining, using the first hints of the first information of the first reply, whether C1 stored at PA1 was overwritten with the first current content during a vulnerability window between a first point in time T1 when the first reply is returned by the second node and a second point in time T2 when the first node performs said retrieving that retrieves the first current content stored at PA1 using PA1 of the first reply, wherein said determining whether C1 stored at PA1 was overwritten with the first current content during the vulnerability window includes performing data validation processing of the first current content with respect to C1 using the first hints; and responsive to determining that C1 stored at PA1 was not overwritten with the first current content during the vulnerability window such that the first current content is C1 and denotes valid content of the target LA, returning the first current content in response to the read I/O operation.

* * * * *